(12) United States Patent
Homme et al.

(10) Patent No.: US 7,151,263 B2
(45) Date of Patent: Dec. 19, 2006

(54) RADIATION DETECTOR AND METHOD OF MANUFACTURE THEREOF

(75) Inventors: Takuya Homme, Hamamatsu (JP); Kazuhisa Miyaguchi, Hamamatsu (JP); Toshio Takabayashi, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 46 days.

(21) Appl. No.: 10/276,726

(22) PCT Filed: May 18, 2001

(86) PCT No.: PCT/JP01/04172

§ 371 (c)(1), (2), (4) Date: Nov. 18, 2002

(87) PCT Pub. No.: WO01/88568

PCT Pub. Date: Nov. 22, 2001

(65) Prior Publication Data

US 2003/0116716 A1  Jun. 26, 2003

(30) Foreign Application Priority Data

May 19, 2000 (JP) .............................. 2000-148280
May 19, 2000 (JP) .............................. 2000-148316

(51) Int. Cl.
*G01T 1/20* (2006.01)

(52) U.S. Cl. .................. 250/370.11; 250/336.1; 250/370.01

(58) Field of Classification Search ........... 250/370.01, 250/336.1, 370.11
See application file for complete search history.

(56) References Cited

U.S. PATENT DOCUMENTS

| 4,766,085 A | * | 8/1988 | Nishigaki et al. ............. 438/95 |
| 5,041,729 A | * | 8/1991 | Takahashi et al. ..... 250/370.11 |
| 5,132,539 A | | 7/1992 | Kwasnick et al. |
| 5,153,438 A | | 10/1992 | Kingsley et al. |
| 5,179,284 A | * | 1/1993 | Kingsley et al. ........ 250/370.11 |
| 5,187,369 A | | 2/1993 | Kingsley et al. |
| 5,208,460 A | | 5/1993 | Rougeot et al. |
| 5,434,418 A | | 7/1995 | Schick .................. 250/370.11 |
| 6,042,267 A | | 3/2000 | Muraki et al. |
| 6,049,074 A | * | 4/2000 | Endo et al. ............... 250/208.1 |

(Continued)

FOREIGN PATENT DOCUMENTS

EP  0 903 590  3/1999

(Continued)

*Primary Examiner*—David Porta
*Assistant Examiner*—Christine Sung
(74) *Attorney, Agent, or Firm*—Drinker Biddle & Reath LLP

(57) ABSTRACT

A solid-state imaging element 2 having a light-receiving portion where a plurality of photoelectric conversion elements 21 are arranged, and electrode pads 22 electrically connected to the photoelectric conversion elements 21 is mounted on a substrate 1 having external connection electrodes 12 and electrode pads 11 electrically connected to them. A scintillator 3 is formed on the surface of the light-receiving portion of the solid-state imaging element 2. The electrodes pads 11 and 22 are electrically connected by wiring lines 4. An electrical insulating organic film 51 tightly seals the scintillator 3 and covers the electrode pads 11 and 22 and the wiring lines 4. A metal thin film 52 is formed on the organic film 51.

11 Claims, 24 Drawing Sheets

U.S. PATENT DOCUMENTS

| | | |
|---|---|---|
| 6,172,371 B1 | 1/2001 | DeJule et al. |
| 6,262,422 B1* | 7/2001 | Homme et al. ......... 250/370.11 |
| 6,278,118 B1* | 8/2001 | Homme et al. ......... 250/370.11 |
| 6,362,482 B1* | 3/2002 | Stettner et al. ......... 250/370.08 |
| 6,414,315 B1 | 7/2002 | Wei et al. |
| 6,608,312 B1* | 8/2003 | Okada et al. .......... 250/370.11 |
| 7,071,543 B1* | 7/2006 | Ichikawa .................... 257/676 |
| 2001/0030291 A1 | 10/2001 | Homme et al. |
| 2001/0045522 A1 | 11/2001 | Homme et al. |
| 2002/0021786 A1* | 2/2002 | Hamamoto et al. ......... 378/189 |
| 2002/0113323 A1* | 8/2002 | Nakanishi et al. .......... 257/784 |
| 2002/0158205 A1 | 10/2002 | Sato et al. |
| 2003/0116714 A1* | 6/2003 | Homme et al. ......... 250/370.11 |
| 2003/0116715 A1* | 6/2003 | Homme et al. ......... 250/370.11 |
| 2003/0173493 A1* | 9/2003 | Homme et al. ............. 250/200 |
| 2004/0089813 A1* | 5/2004 | Takabayashi et al. .. 250/370.11 |
| 2004/0136493 A1* | 7/2004 | Konno et al. .................. 378/19 |
| 2005/0092927 A1* | 5/2005 | Nagano ................. 250/370.11 |
| 2005/0139985 A1* | 6/2005 | Takahashi .................... 257/698 |
| 2005/0167604 A1* | 8/2005 | Suganuma et al. .... 250/370.11 |
| 2005/0184244 A1* | 8/2005 | Yoshimuta et al. .... 250/370.01 |
| 2006/0049533 A1* | 3/2006 | Kamoshita .................. 264/1.7 |
| 2006/0108683 A1* | 5/2006 | Takeda ....................... 257/723 |
| 2006/0166405 A1* | 7/2006 | Ichikawa .................... 438/109 |

FOREIGN PATENT DOCUMENTS

| | | |
|---|---|---|
| EP | 0 932 053 | 7/1999 |
| EP | 1 258 737 A1 | 11/2002 |
| EP | 1 258 738 A1 | 11/2002 |
| JP | SHO59-122988 | 7/1984 |
| JP | 05-060871 | 3/1993 |
| JP | 07-027863 | 1/1995 |
| JP | HEI10-282243 | 10/1998 |
| JP | 2000-009845 | 1/2000 |
| WO | WO 98/32179 | 7/1998 |
| WO | 98/36290 | 8/1998 |
| WO | WO98/36291 | 8/1998 |
| WO | WO99/66346 | 12/1999 |

* cited by examiner

RADIATION DETECTOR AND METHOD OF MANUFACTURE THEREOF

TECHNICAL FIELD

The present invention relates to a radiation detector used for radiation imaging and a manufacturing method thereof and, more particularly, to a method of manufacturing a compact dental radiation detector used upon insertion into an oral cavity.

BACKGROUND ART

X-ray image sensors using a CCD instead of an X-ray sensitive film are becoming popular as a medical X-ray diagnostic apparatus. In such a radiation imaging system, a radiation detector having a plurality of pixels acquires two-dimensional image data by radiation as an electrical signal, and this signal is processed by a processor and displayed on a monitor. A typical radiation detector has a structure in which a scintillator is arranged on one- or two-dimensionally arranged photodetectors and incident radiation is converted into light by the scintillator to detect the light.

WO98/36291 discloses a radiation detector in which CsI is used as a scintillator material and a protective film made of parylene or the like is formed for hygroscopic prevention of the scintillator. This radiation detector has a structure in which a bonding pad is exposed from the protective film. The bonding pad and an external wiring line are connected to read an image signal.

DISCLOSURE OF INVENTION

A dental radiation detector used upon insertion into an oral cavity requires a larger imaging area while downsizing the whole detector. When the compact radiation detector adopts the above structure, an increase in light-receiving portion narrows the interval between bonding pads. This makes it difficult to form a protective film and connect an external wiring line, decreasing the manufacturing operability.

It is an object of the present invention to provide a radiation detector which can attain both a small size and a large imaging area, and ensure durability with a simple manufacturing process.

To solve the above problems, a radiation detector according to the present invention is characterized by comprising (1) a solid-state imaging element having a light-receiving portion where a plurality of photoelectric conversion elements are arranged, and electrode pads electrically connected to the photoelectric conversion elements, (2) a substrate which has external connection electrodes and electrode pads electrically connected to the external connection electrodes and on which the solid-state imaging element is fixed, (3) a scintillator formed on a surface of the light-receiving portion of the solid-state imaging element, (4) wiring lines which electrically connect the respective electrode pads of the solid-state imaging element and the substrate, (5) an electrical insulating covering member which is formed to cover at least the wiring lines and the electrode pads, (6) an electrical insulating organic film which is formed to tightly seal at least the scintillator, and (7) a metal thin film which is formed to cover a portion of the organic film on the scintillator.

The covering member includes one which is formed integrally with the organic film.

A radiation detector manufacturing method according to the present invention is characterized by comprising the steps of: (1) fixing a solid-state imaging element having a light-receiving portion where a plurality of photoelectric conversion elements are arranged and having electrode pads electrically connected to the photoelectric conversion elements to a support surface of a substrate having external connection electrodes and electrode pads electrically connected to the external connection electrodes so as to make corresponding electrode pads face each other, (2) electrically connecting the corresponding electrode pads by wiring lines, (3) covering at least the wiring lines with an electrical insulating covering member, (4) forming a scintillator on the light-receiving portion of the solid-state imaging element, (5) tightly sealing the covering member and the scintillator with an electrical insulating organic film, (6) forming a metal thin film which covers a portion of the organic film on the scintillator, and (7) exposing the external connection electrodes.

Instead of the steps (3) to (5), the radiation detector manufacturing method according to the present invention may comprise the steps of: (4) forming a scintillator on the light-receiving portion of the solid-state imaging element, and (5) forming an electrical insulating organic film which covers the electrode pads, the wiring lines, and the scintillator, thereby tightly sealing the scintillator.

According to the present invention, external electrical connection lines can be easily formed in the radiation detector, improving the operability. In a compact radiation detection element, the light-receiving portion can be formed as large as possible. The organic film tightly seals the scintillator, and the humidity resistance can be ensured. The electrode pads and wiring lines are covered and protected by the covering member (including a case wherein the covering member is integrated with the organic film, i.e., the covering member is the organic film itself). Wiring disconnection can be effectively prevented during and after the manufacture.

The metal thin film formed on the organic film further improves the humidity resistance. Short-circuiting can be prevented in the presence of the electrical insulating protective resin or organic film between the metal thin film, the wiring lines, and the electrode pads.

The radiation detector may further comprise an electrical insulating protective resin which covers the wiring lines from above the organic film. This structure can more reliably protect the wiring lines from short-circuiting and disconnection.

The organic film may cover the scintillator including the electrode pads from above the covering member. Short-circuiting via the electrode pads can be more reliably prevented.

The radiation detector may further comprise a second organic film formed on the metal thin film. The durability of the protective film is improved by covering the metal thin film with the organic film.

The organic film may cover up to an exposed surface of the substrate. The humidity resistance is further assured by covering the substrate surface with the organic film.

BEST MODE OF CARRYING OUT THE INVENTION

Figure 1:
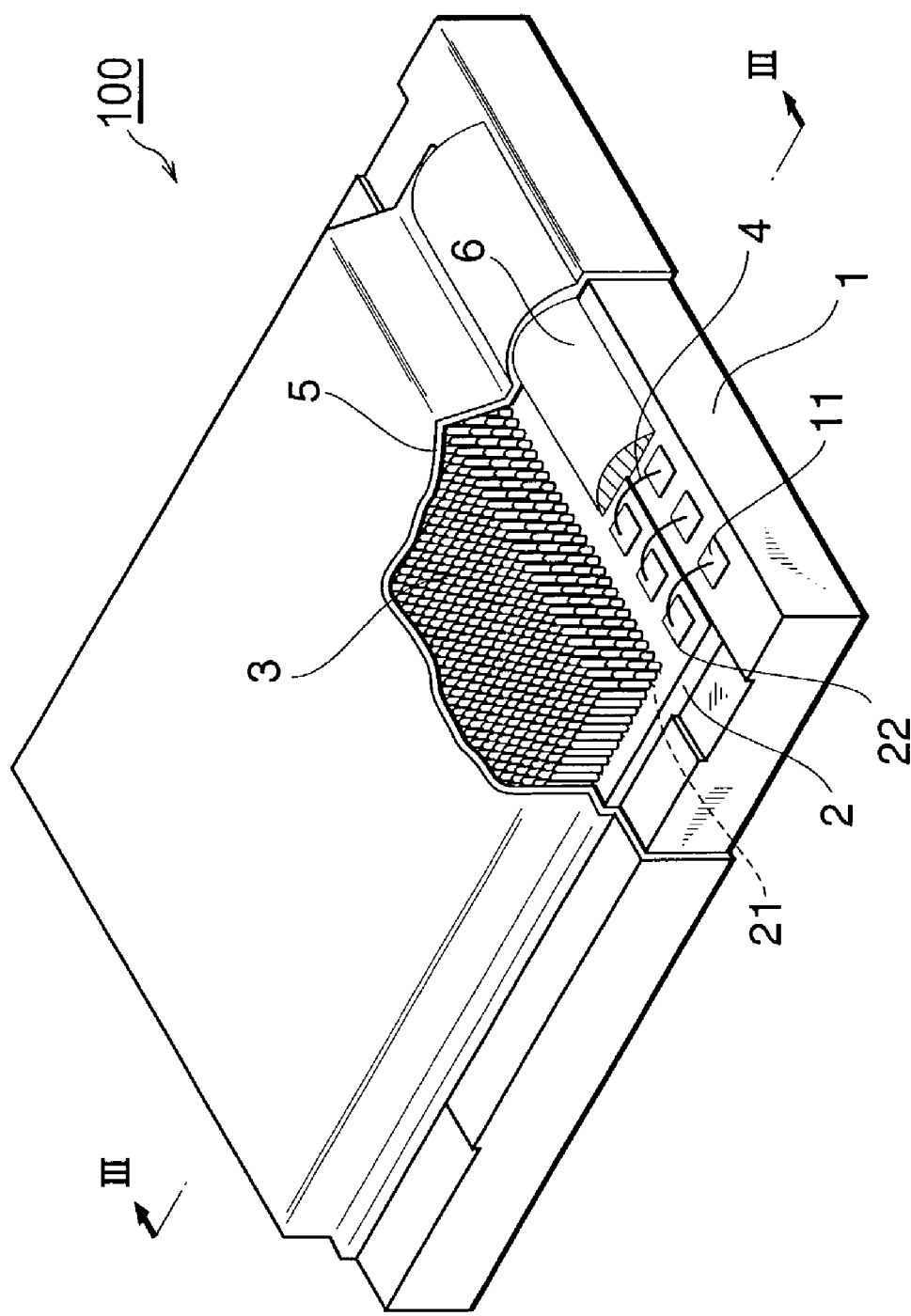
FIG. 1 is a perspective view showing the first embodiment of a radiation detector according to the present invention.

Preferred embodiments of the present invention will be described in detail below with reference to the accompanying drawings. For descriptive convenience, the same reference numerals denote the same parts throughout the drawings, and a repetitive description thereof will be omitted.

Figure 2:
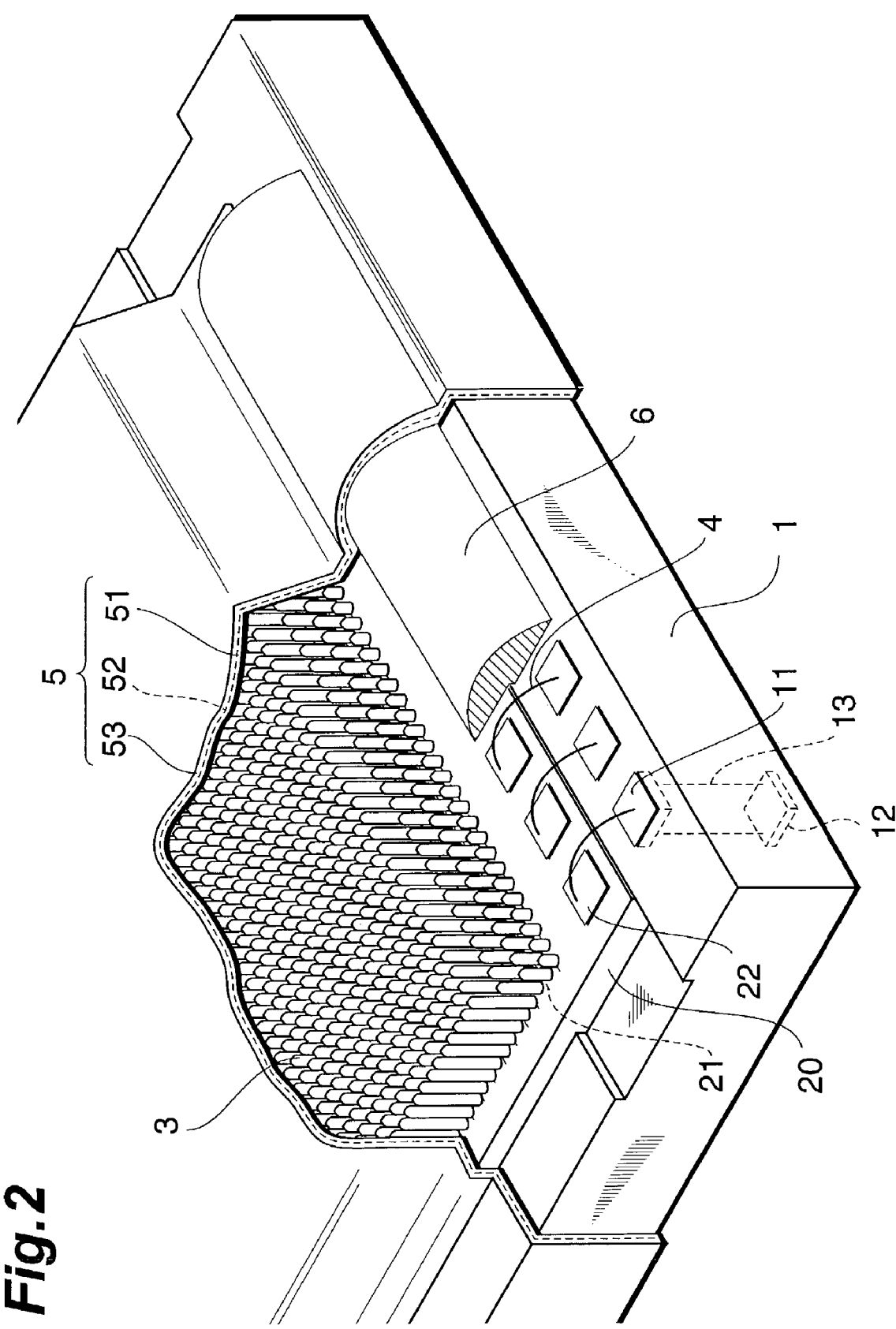
FIG. 2 is a partial enlarged view thereof.
Figure 3:
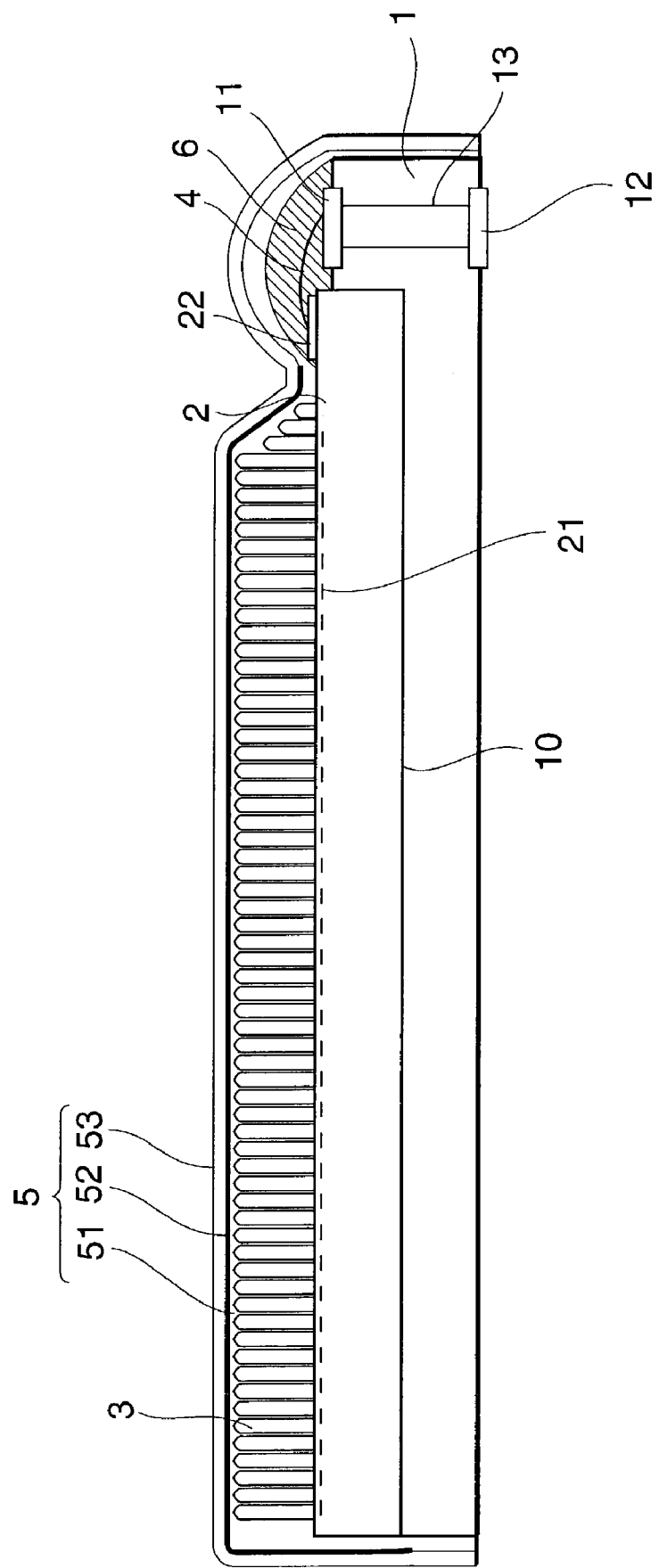
FIG. 3 is a side view thereof.

FIG. 1 is a perspective view showing an embodiment of a radiation detector according to the present invention, FIG. 2 is an enlarged view thereof, and FIG. 3 is a sectional view thereof. A radiation detector 100 of this embodiment is constituted by mounting a solid-state imaging element 2 on a ceramic substrate 1. The substrate 1 has in its upper surface a cavity 10 where the solid-state imaging element 2 is set and stored. The cavity 10 is provided on the the upper surface of the substrate 1, a plurality of electrode pads 11 are arrayed along one side of the substrate 1. These electrode pads 11 are electrically connected to external connection electrode terminals 12 on the lower surface of the substrate 1 via wiring lines 13 extending through the substrate 1.

The solid-state imaging element 2 is comprised of a CCD image sensor, and a portion where photoelectric conversion elements 21 are arrayed forms a light-receiving portion. Each photoelectric conversion element 21 is electrically connected via a signal line (not shown) to a corresponding one of electrode pads 22 arranged on one side of the solid-state imaging element 2. The solid-state imaging element 2 is mounted on the substrate 1 such that corresponding electrode pads 11 and 22 are located close to each other. Corresponding electrode pads 11 and 22 are electrically connected by wiring lines 4.

A columnar scintillator 3 which converts incident radiation into light of a waveband sensed by the photoelectric conversion element 21 is formed at the light-receiving portion of the solid-state imaging element 2. The scintillator 3 can be made of various materials, and can preferably adopt Tl-doped CsI with high emission efficiency.

A protective resin layer 6 is so formed as to cover the electrode pads 11 and 22 and the wiring lines 4. The protective resin layer 6 is preferably made of a resin having a good adhesion property with a protective film 5 (to be described later), e.g., WORLD ROCK No. 801-SET2 (70,000 cP type) available from Kyoritsu Chemical & Co., Ltd. as an acrylic adhesive.

The protective film 5 covers the surfaces of the solid-state imaging element 2 and substrate 1. The protective film 5 transmits X-rays and cuts off water vapor. The protective film 5 is formed by stacking an electrical insulating first organic film 51, metal thin film 52, and electrical insulating second organic film 53 on the substrate 1.

The first and second organic films 51 and 53 are preferably made of a polyparaxylylene, resin (Parylene available from Three Bond Co., Ltd.), and particularly polyparachloroxylylene (Parylene C also available from Three Bond Co., Ltd.). The parylene coating film hardly transmits water vapor and gas. This film has high repellency, high chemical resistance, and high electrical insulating property even as a thin film. In addition, the parylene coating film is transparent to radiation and visible light. These properties are suitable for the organic films 51 and 53. The metal thin film 52 can be a metal thin film of gold, silver, aluminum, or the like. The metal thin film 52 functions as a mirror which increases the detection sensitivity of the detector by reflecting, of light emitted by the scintillator 3, light traveling toward not the solid-state imaging element 2 but the radiation incident plane.

Figure 4:
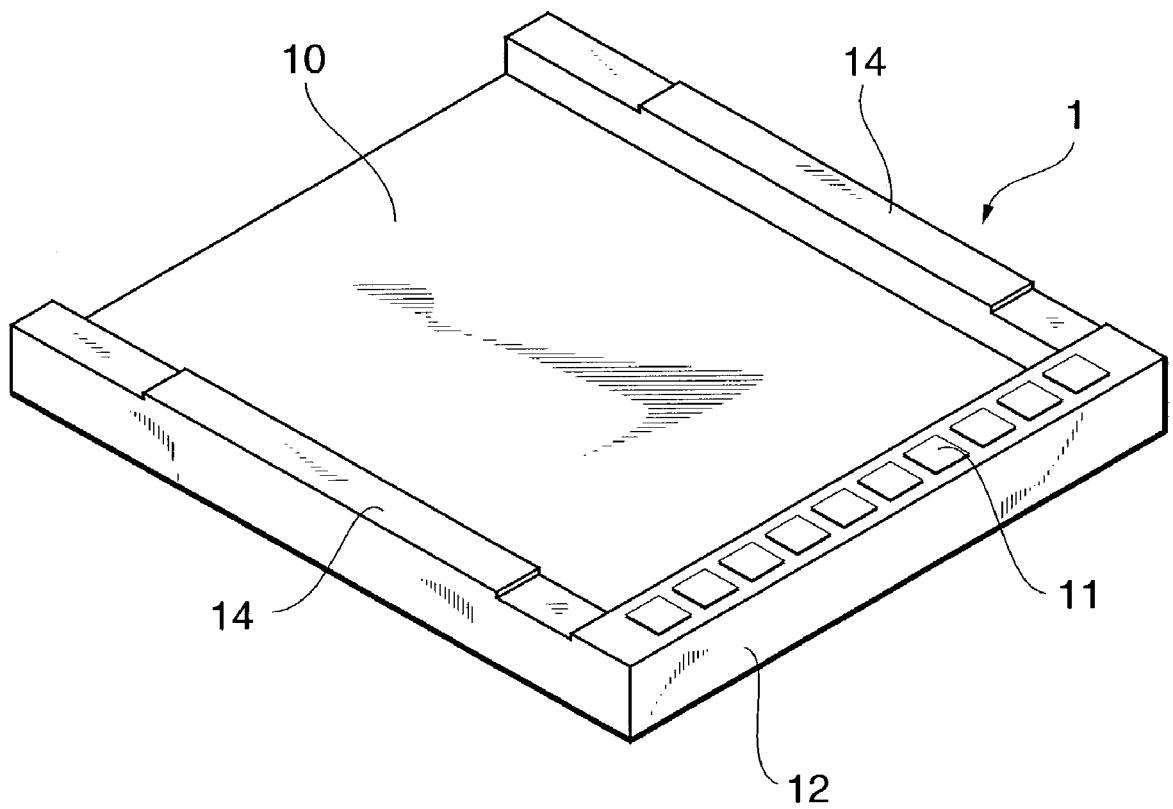
FIG. 4 is a perspective view of a substrate used for the apparatus of FIG. 1.

The manufacturing process of the radiation detector according to the present invention will be explained in detail with reference to FIGS. 4 to 14. First, the substrate 1 as shown in FIG. 4 is prepared. The external connection electrode terminals 12 are arrayed on the lower surface of the substrate 1, whereas the electrode pads 11 are arrayed on its upper surface. Guides 14 projecting toward the upper surface side are formed on two facing sides adjacent to one side along which the electrode pads 11 are arrayed. The cavity 10 is formed in a portion sandwiched by the guides 14.

Figure 5:
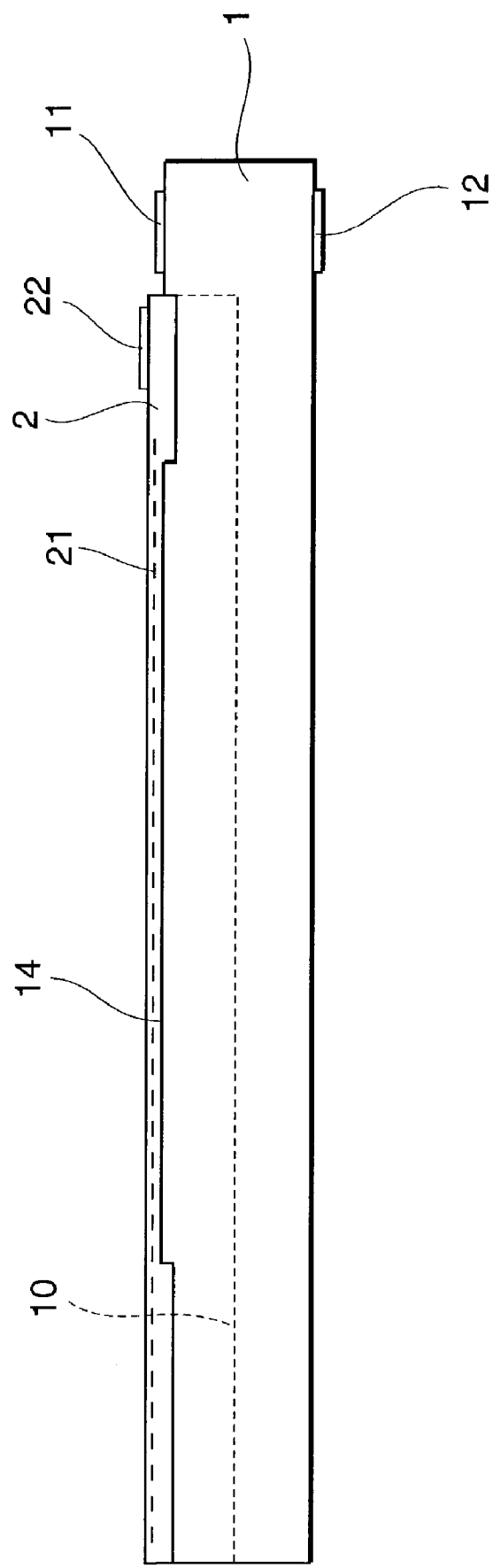
FIGS. 5 to 14 are side and perspective views for explaining the manufacturing process of the first embodiment.
Figure 6:
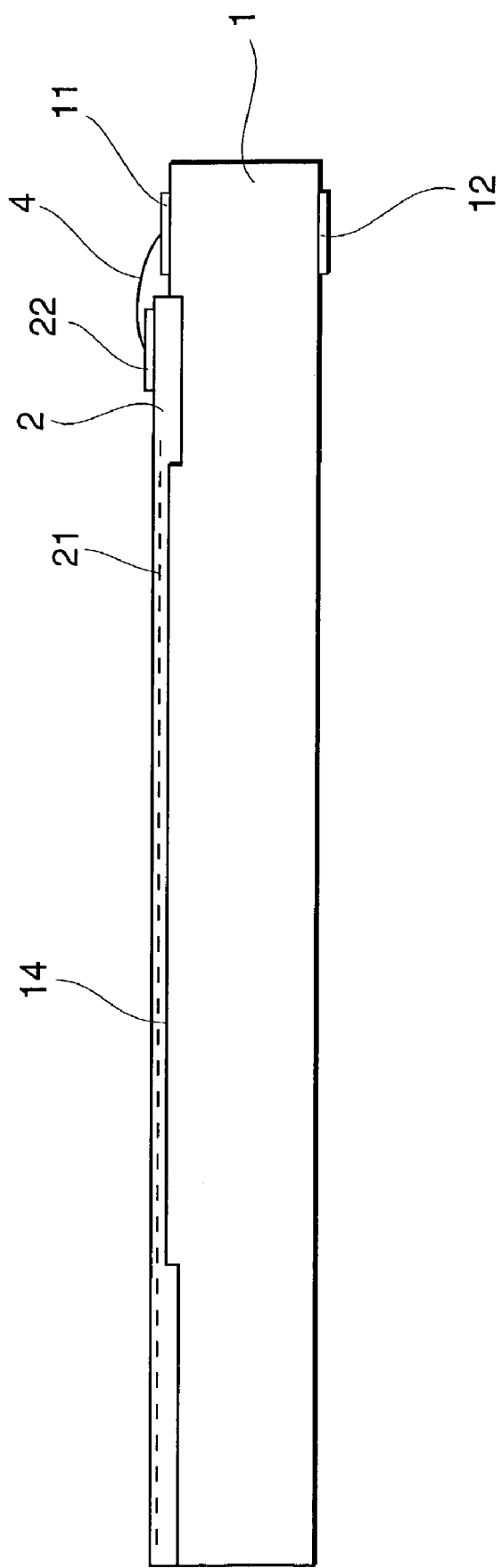
Figure 7:
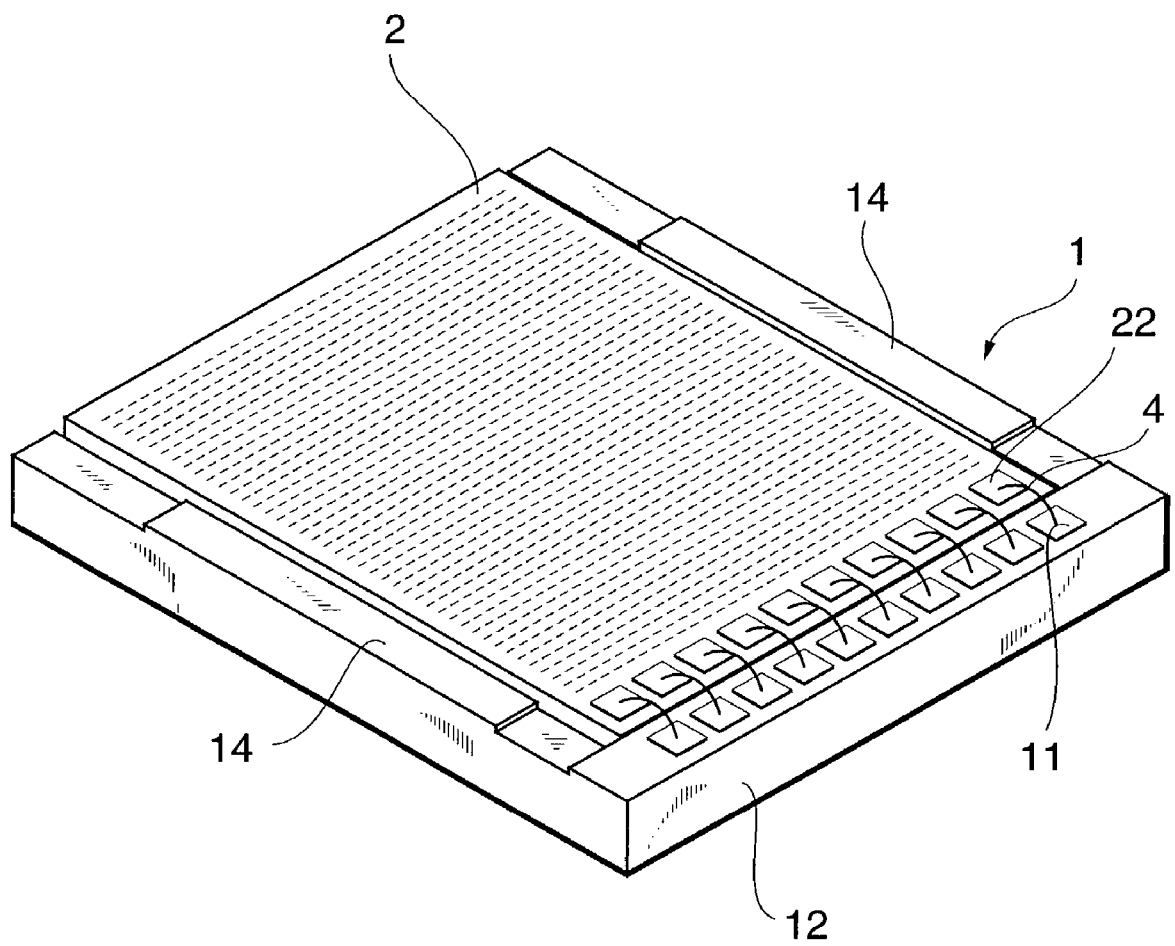
Figure 8:
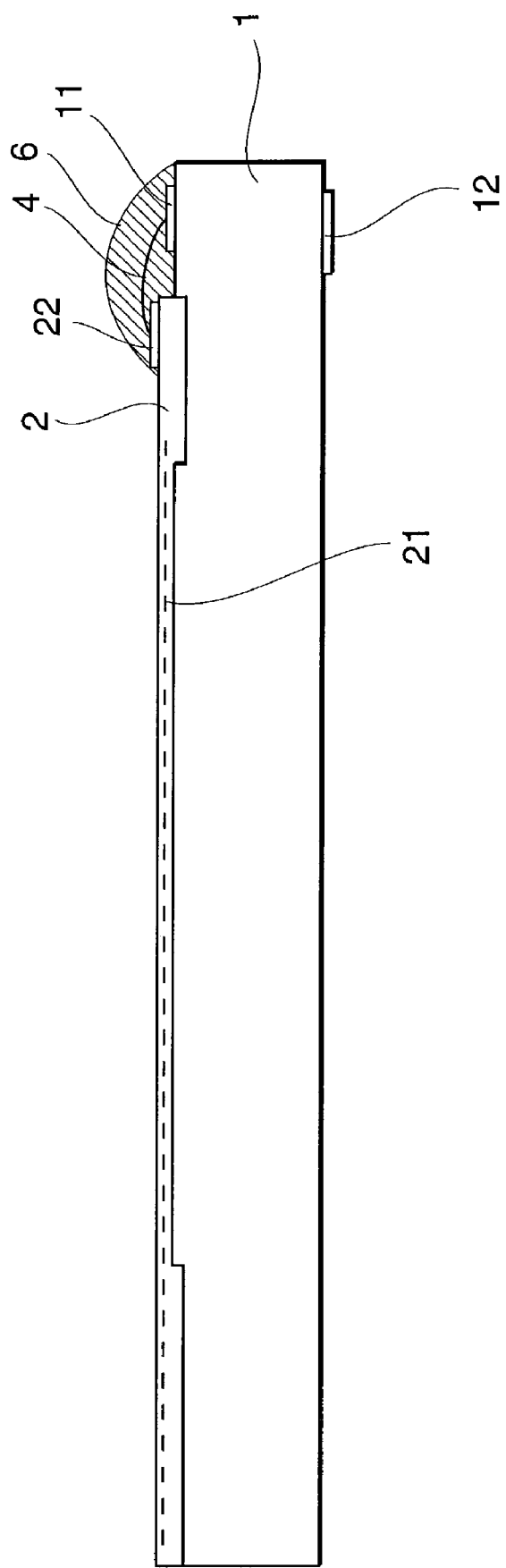
Figure 9:
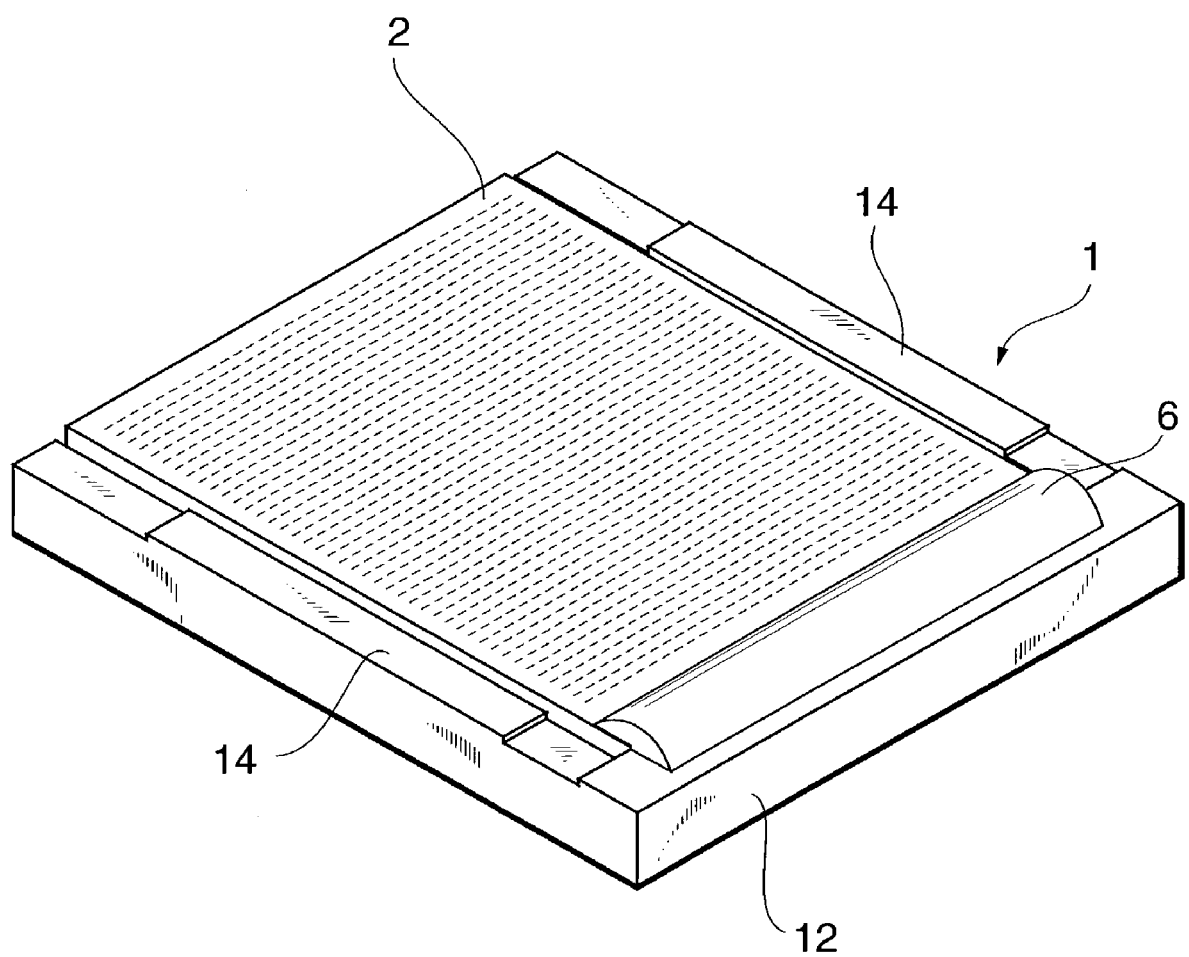

The solid-state imaging element 2 is set and fixed in the cavity 10 with the light-receiving surface of the photoelectric conversion element 21 facing up, as shown in FIG. 5, such that the electrode pads 22 are directed to the electrode pads 11 of the substrate 1. At this time, the use of the guides 14 facilitates locating the solid-state imaging, element 2. Then, the electrode pads 11 and 22 are electrically connected via the wiring lines 4 by wire bonding (see FIGS. 6 and 7). As shown in FIGS. 8 and 9, a resin is so applied as to cover the electrode pads 11 and 22 and the wiring lines 4. This resin is cured to form a protective resin layer 6, and the wiring lines 4 are potted. Since the wiring lines 4 are sealed and protected in the resin, the adhesion and mechanical strengths of the wiring lines 4 increase to prevent damage to the wiring lines 4 such as disconnection or short-circuiting in a subsequent manufacturing process and the use.

Figure 10:
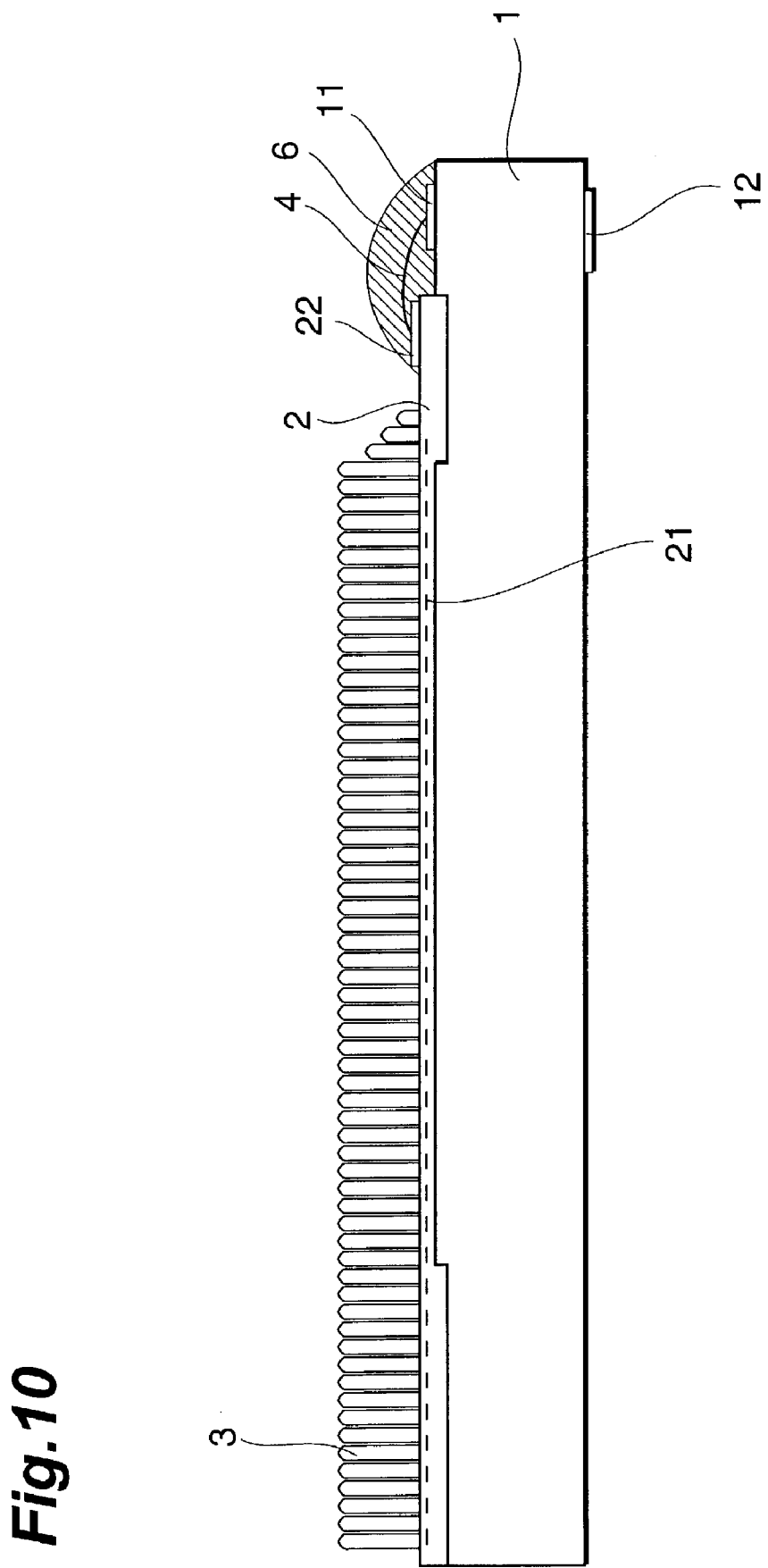
Figure 11:
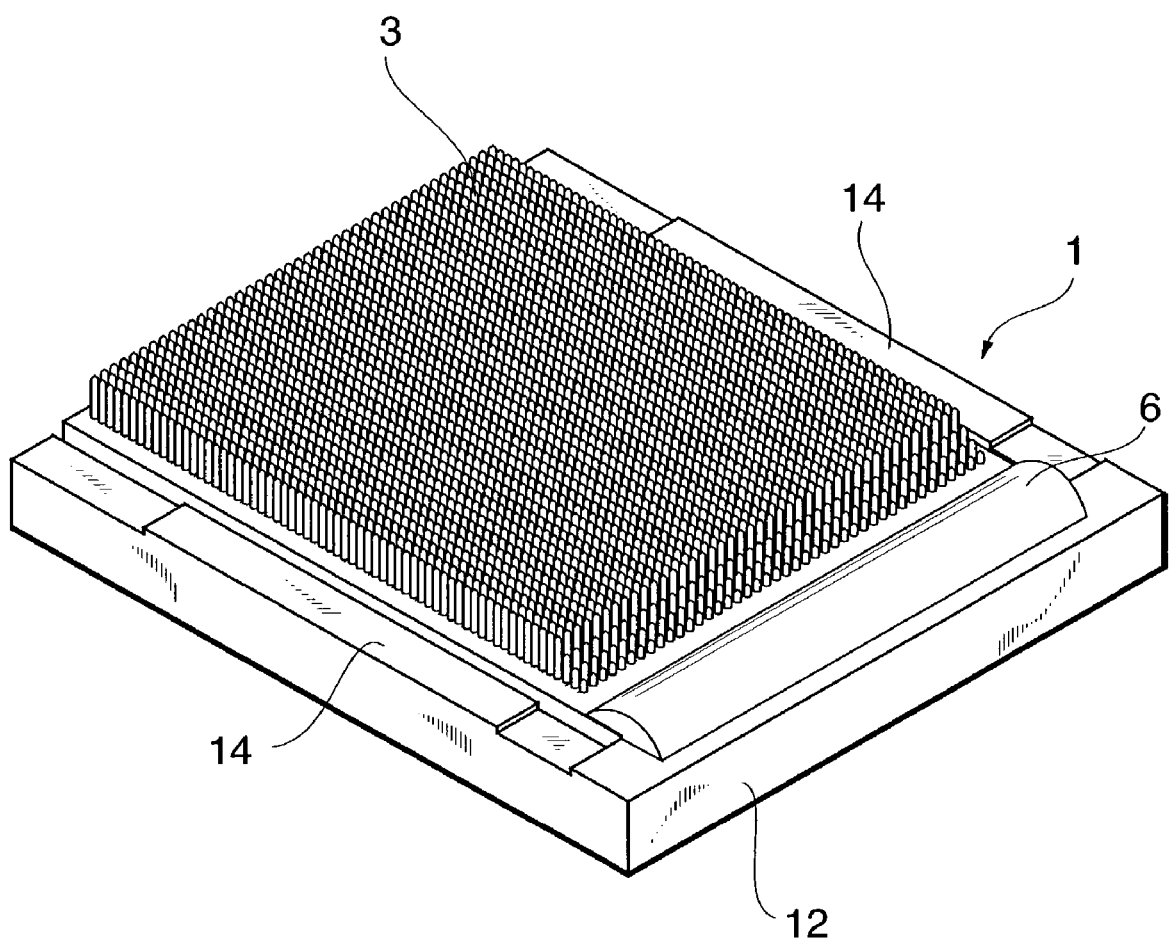

As shown in FIGS. 10 and 11, Tl-doped-CsI is grown as columnar crystals to a thickness of about 200 μm by vacuum deposition on the light-receiving portion of the solid-state imaging element 2, thereby forming the layer of a scintillator 3. Since the electrode pads 11 and 22 and the wiring lines 4 are sealed in the protective resin layer 6, the scintillator 3 is not brought into contact with the electrode pads 11 and 22 and the wiring lines 4. CsI is high deliquescent, and if CsI is kept exposed, it absorbs water vapor in air and dissolves. To protect the scintillator, the overall substrate 1 with the solid-state imaging element 2 bearing the scintillator 3 is covered with a 10-μm thick parylene film by CVD (Chemical Vapor Deposition), thus forming a first organic film 51.

More specifically, coating by deposition is performed in vacuum, similar to vacuum deposition of a metal. This process includes the step of thermally decomposing a diparaxylylene monomer serving as a raw material and quenching the product in an organic solvent such as toluene or benzene to obtain diparaxylylene called a dimer, the step of thermally decomposing the dimer to produce stable radical paraxylylene gas, and the step of absorbing and polymerizing the produced gas in a raw material to form a polyparaxylylene film with a molecular weight of about 500,000 by polymerization.

There is a gap between CsI columnar crystals, but parylene enters this narrow gap to a certain degree. The first organic film 51 tightly contacts the layer of the scintillator 3 and tightly seals the scintillator 3. The first organic film 51 is also formed on the protective resin layer 6 to covert the wiring portion. By parylene coating, a uniform-thickness precise thin film coating can be formed on the corrugated layer surface of the scintillator 3. CVD formation of parylene can be achieved at room temperature with a lower degree of vacuum than in metal deposition, and parylene can be easily processed.

Figure 13:
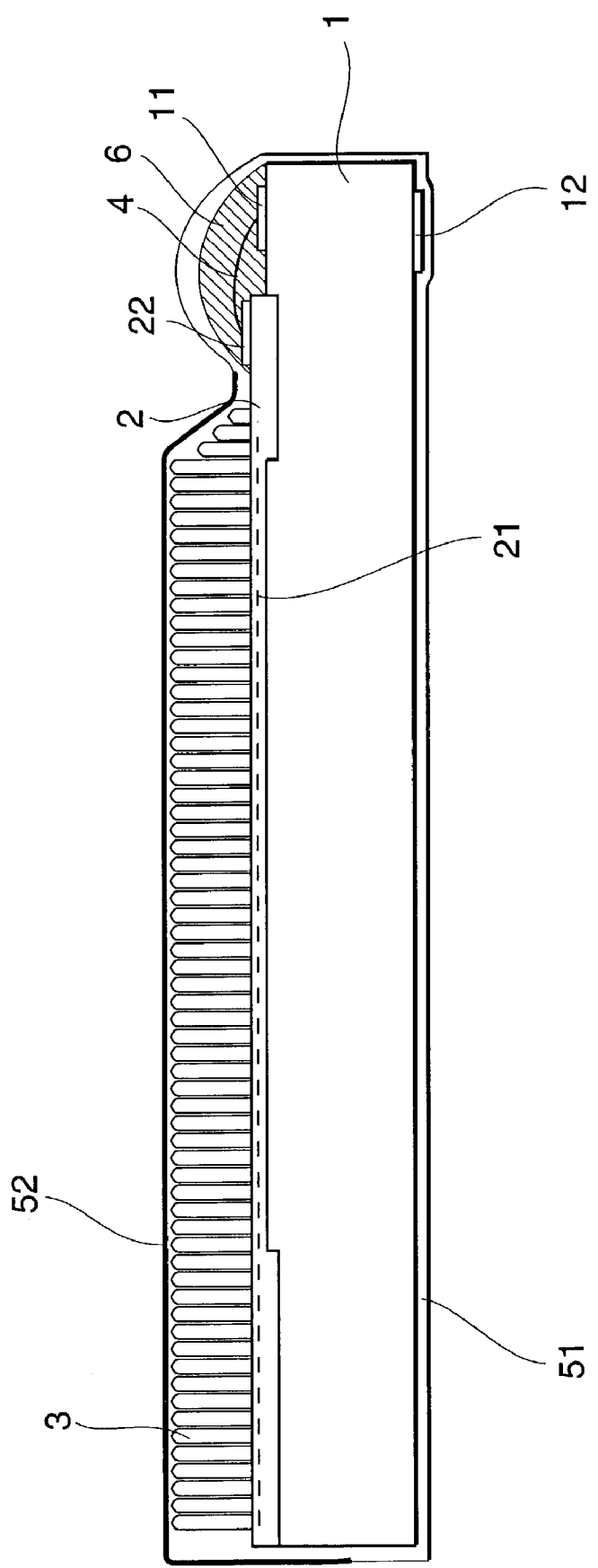
Figure 14:
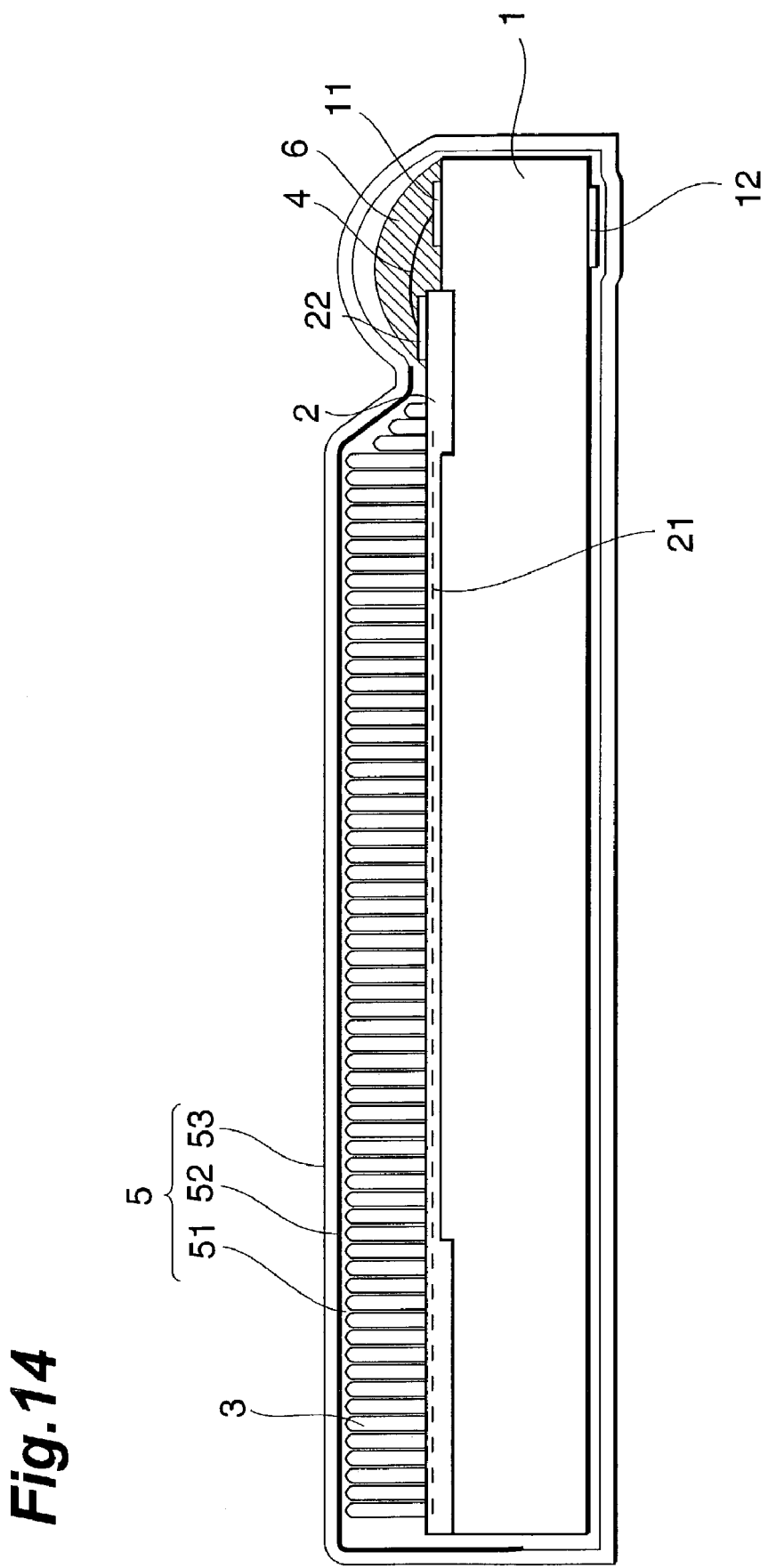

As shown in FIG. 13, a 0.15-μm thick Al film is formed on the incident surface of the first organic film 51 by vapor, deposition, thereby forming a metal thin film 52. In forming the metal thin film 52, a proper mask (not shown) is desirably arranged in front of the layer of the scintillator 3 so as to form the metal thin film 52 only immediately above the layer of the scintillator 3 on the first organic film 51. Even if the mask is arranged, metal vapor may slightly flow outside the mask in vapor deposition. Especially at a small interval between the light-receiving portion and the electrode pad, it is difficult to form the metal thin film 52 only immediately above the layer of the scintillator 3. The metal may be deposited on the wiring lines 4 and the electrode pads 11 and 22. According to the present invention, the metal thin film 52 is not directly formed on the wiring lines 4 and the electrode pads 11 and 22 because the wiring lines 4 and the electrode pads 11 and 22 are covered with the protective resin layer 6 and first organic film 51. Short-circuiting of the wiring lines 4 and the electrode pads 11 and 22 by the metal thin film 52 can be effectively prevented.

Also when no mask is arranged in vapor deposition of the metal thin film 52, the metal thin film 52 is formed on the wiring lines 4 and the electrode pads 11 and 22. However, the wiring lines 4 and the electrode pads 11 and 22 are covered with the protective resin layer 6 and first organic film 51, and short-circuiting can be prevented. The humidity resistance can be further increased by widely forming the metal thin film 52 so as to cover the protective resin layer 6. Even a gap generated in curing the protective resin layer 6 or by another manufacturing problem is filled by the first organic film 51 which enters the gap. Therefore, the metal thin film 52 is not directly formed on the wiring lines 4 and the electrode pads 11 and 22 below or in the protective resin layer 6, enhancing the short-circuiting prevention effect.

Figure 12:
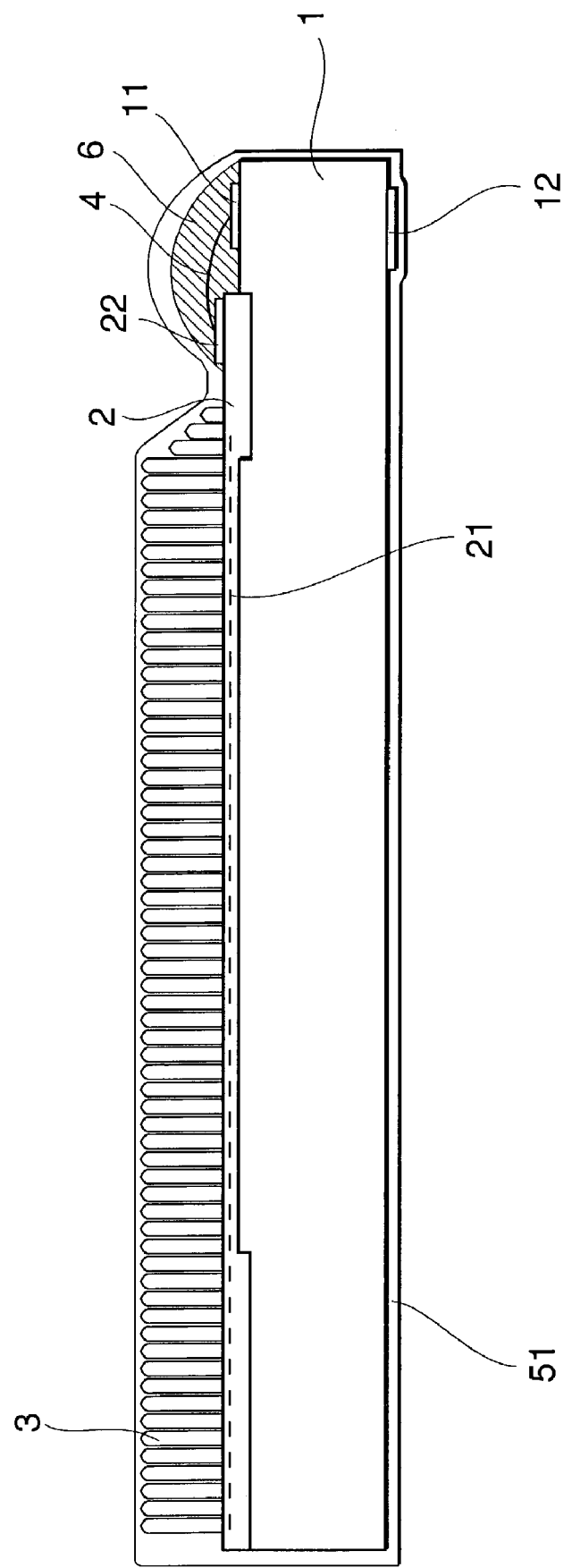

After that, parylene is applied to a thickness of 10 μm on the entire surface of the substrate by CVD again, thus forming a second organic film 53 (see FIG. 12). The second organic film 53 prevents contamination, peeling, or oxidization of the metal thin film 52 by handling or the like. In this manner, a protective film 5 as a multilayered structure of the first organic film 51, metal thin film 52, and second organic film 53 is formed.

When the metal thin film 52 is formed on the wiring lines 4 and the electrode pads 11 and 22 via the protective resin layer 6 and first organic film 51, the protective resin layer 6 is triple-covered with the first organic film 51, metal thin film 52, and second organic film 53. When the metal thin film 52 is formed using a mask, as described above, the protective resin layer 5 is double-coated with the first and second organic films 51 and 53.

Of the formed protective film 5, the protective film 5 on the lower surface of the substrate 1 is removed to expose the external connection electrode terminals 12 on the lower surface of the substrate 1. As a result, the radiation detector shown in FIGS. 1 to 3 is obtained.

The operation of this embodiment will be described with reference to FIGS. 1 to 3. X-rays (radiation) coming from the incident surface reach the scintillator 3 through the protective film 5, i.e., all the second organic film 53, metal thin film 52, and first organic film 51. X-rays are absorbed by the scintillator 3, which radiates light proportional to the quantity of X-rays. Of the radiated light, light opposite to the X-ray incident direction passes through the first organic film and is reflected by the metal thin film 52. Hence, almost all light generated by the scintillator 3 enters the solid-state imaging element 2. This realizes high-sensitivity measurement with high efficiency.

Each photoelectric conversion element 2 generates an electrical signal corresponding to the quantity of visible light by photoelectric conversion, and accumulates the signal for a predetermined time. The quantity of visible light corresponds to the quantity of incident X-rays. That is, the electrical signal accumulated in each photoelectric conversion element 2 corresponds to the quantity of incident X-rays, and an image signal corresponding to an X-ray image can be obtained. The image signal accumulated in the photoelectric conversion element 2 is output from a signal line (not shown) and finally from the electrode terminal 12 via the electrode pad 22, wiring line 4, electrode pad 11, and wiring line 13. The image signal is externally transferred, and processed by a predetermined processing circuit to display an X-ray image with a high S/N ratio.

Figure 15:
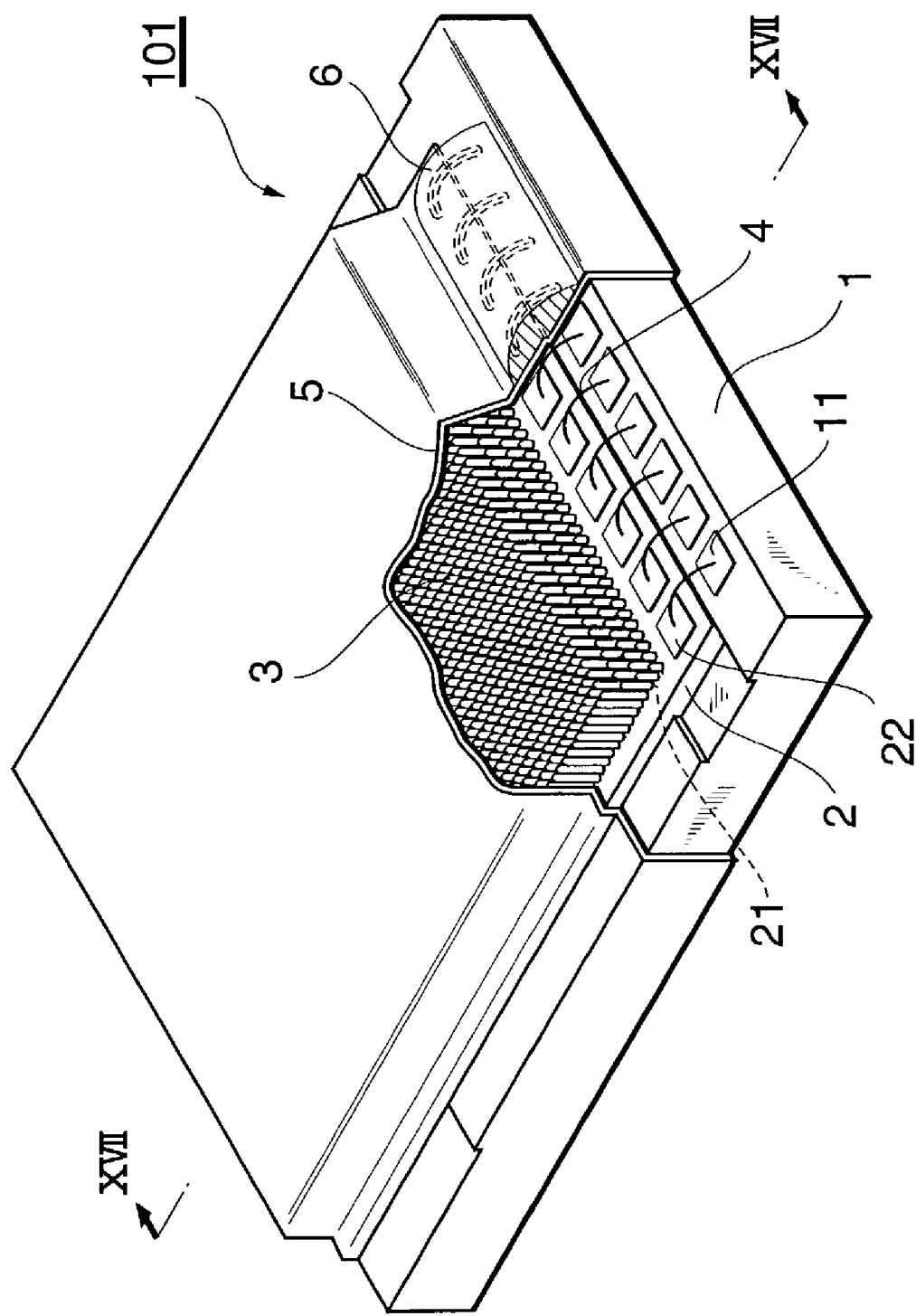
FIG. 15 is a perspective view showing the second embodiment of a radiation detector according to the present invention.
Figure 16:
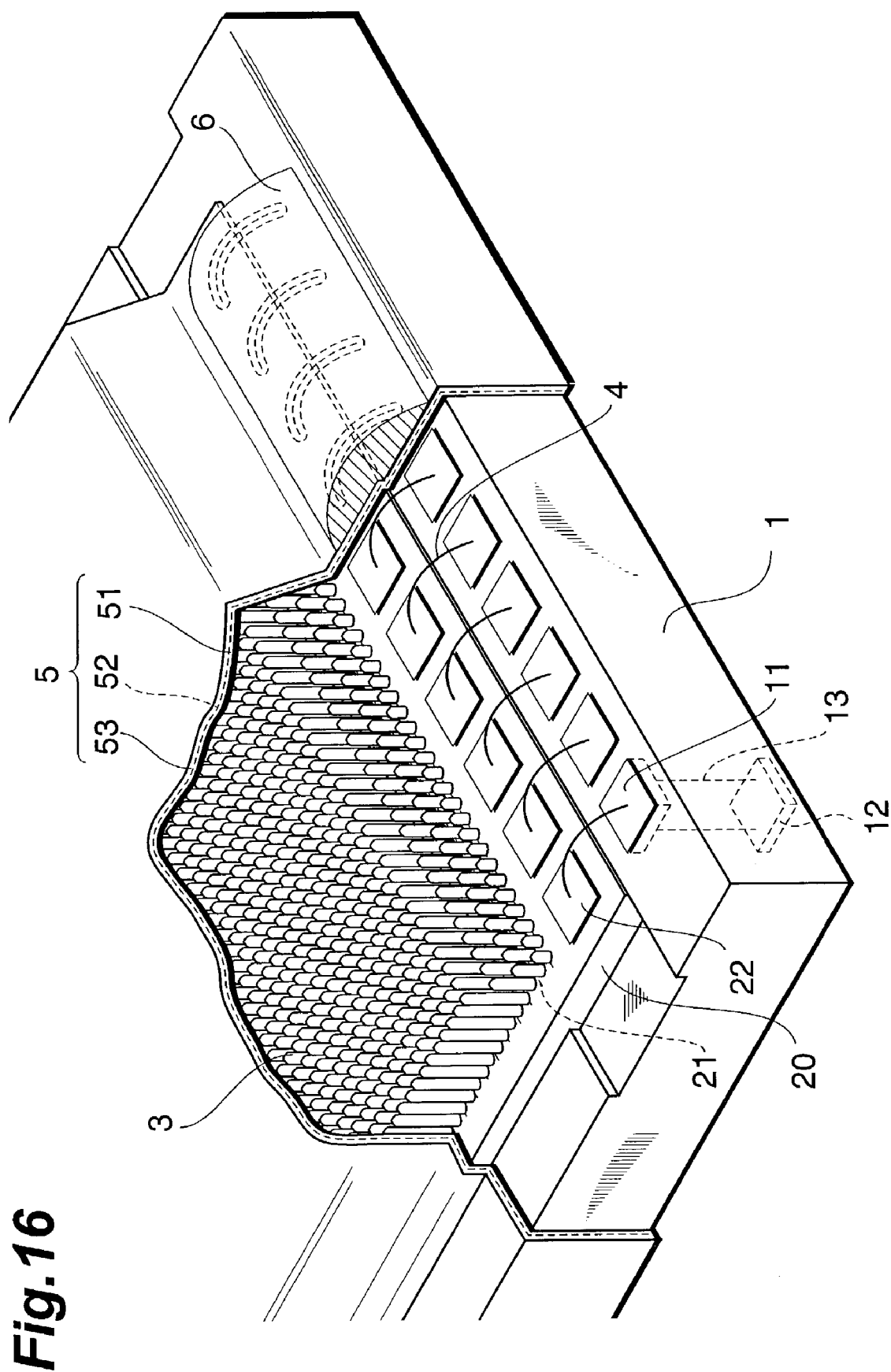
FIG. 16 is a partial enlarged view thereof.
Figure 17:
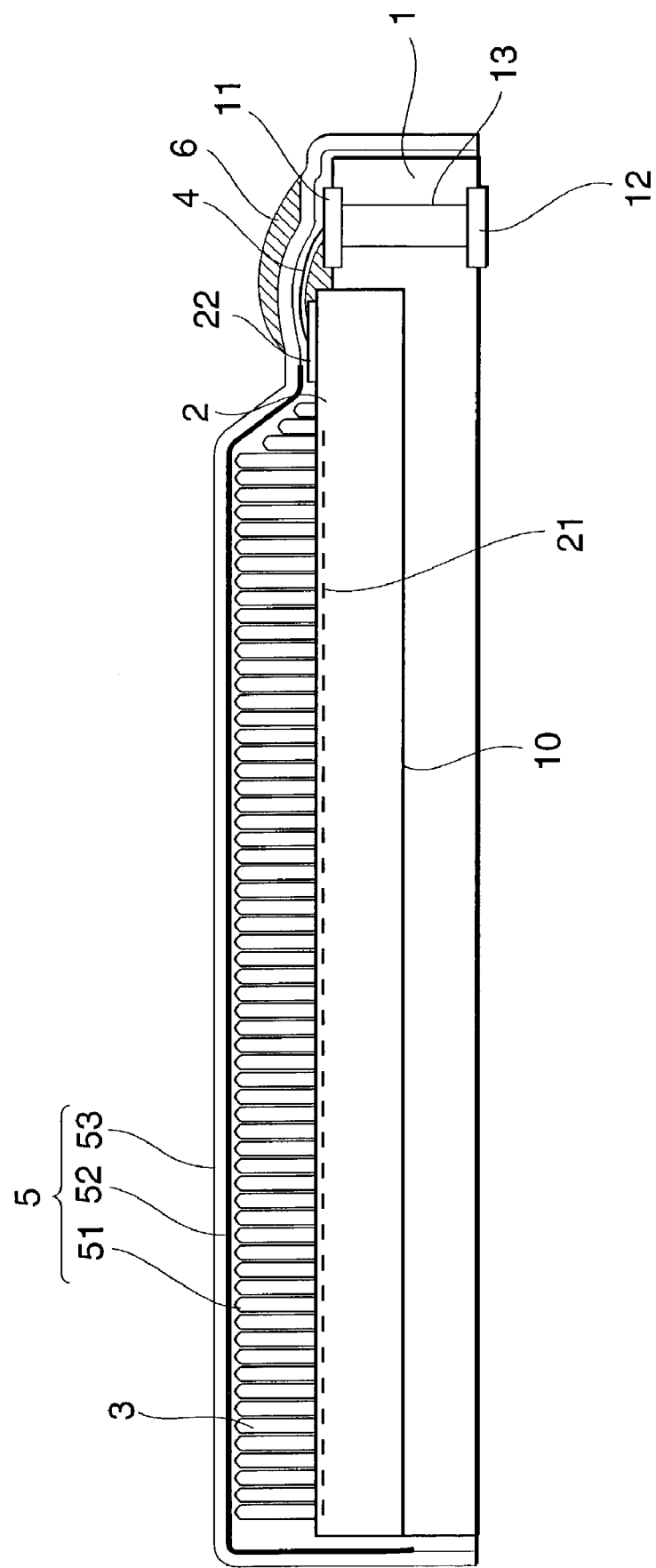
FIG. 17 is a side view thereof.

The second embodiment of a radiation detector according to the present invention will be described. FIG. 15 is a perspective view showing the second embodiment, FIG. 16 is an enlarged view thereof, and FIG. 17 is a sectional view thereof. A radiation detector 101 of the second embodiment is constituted by mounting a solid-state imaging element 2 on a ceramic substrate 1, similar to the radiation detector 100 of the first embodiment. The structures of the substrate 1, the solid-state imaging element 2, and a scintillator 3 are the same as those of the first embodiment.

The second embodiment is different from the first embodiment in the protective structure of wiring lines 4. More specifically, the wiring lines 4 are covered with a protective film 5 which covers the surfaces of the solid-state imaging element 2 and substrate 1 (and is constituted by stacking an electrical insulating first organic film 51, metal thin film 52, and electrical insulating second organic film 53 on the substrate 1, similar to the first embodiment). A protective resin layer 6 is so formed as to cover the protective film 5 on electrode pads 11 and 22 and the wiring lines 4. Similar to the first embodiment, the protective resin layer 6 is preferably made of a resin having a good adhesion property with the protective film 5, e.g., WORLD ROCK No. 801-SET2 (70,000 cP type) available from Kyoritsu Chemical & Co., Ltd. as an acrylic adhesive.

The manufacturing process of the radiation detector according to the present invention will be explained in detail. Steps up to setting the solid-state imaging element 2 on the substrate 1 and electrically connecting the electrode pads 11 and 22 with the wiring lines 4 by wire bonding are the same as those in the first embodiment (see FIGS. 4 to 7).

Figure 18:
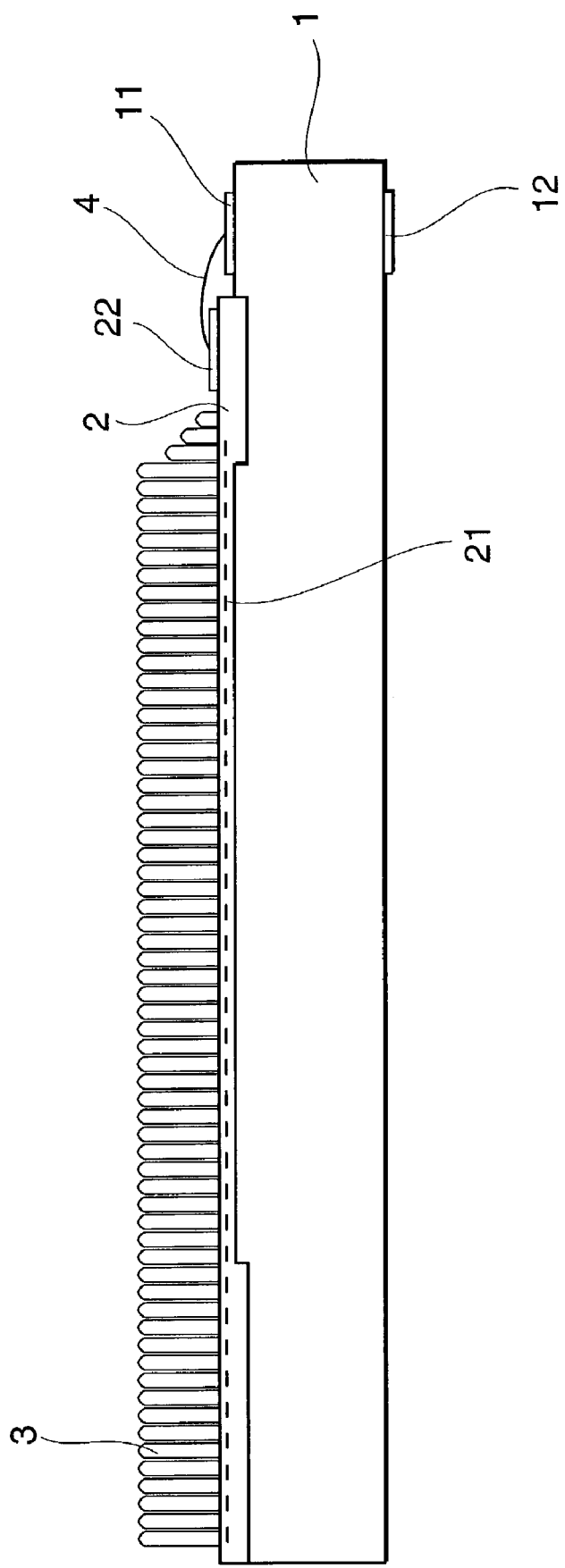
FIGS. 18 to 23 are perspective and side views for explaining the manufacturing process of the second embodiment.
Figure 19:
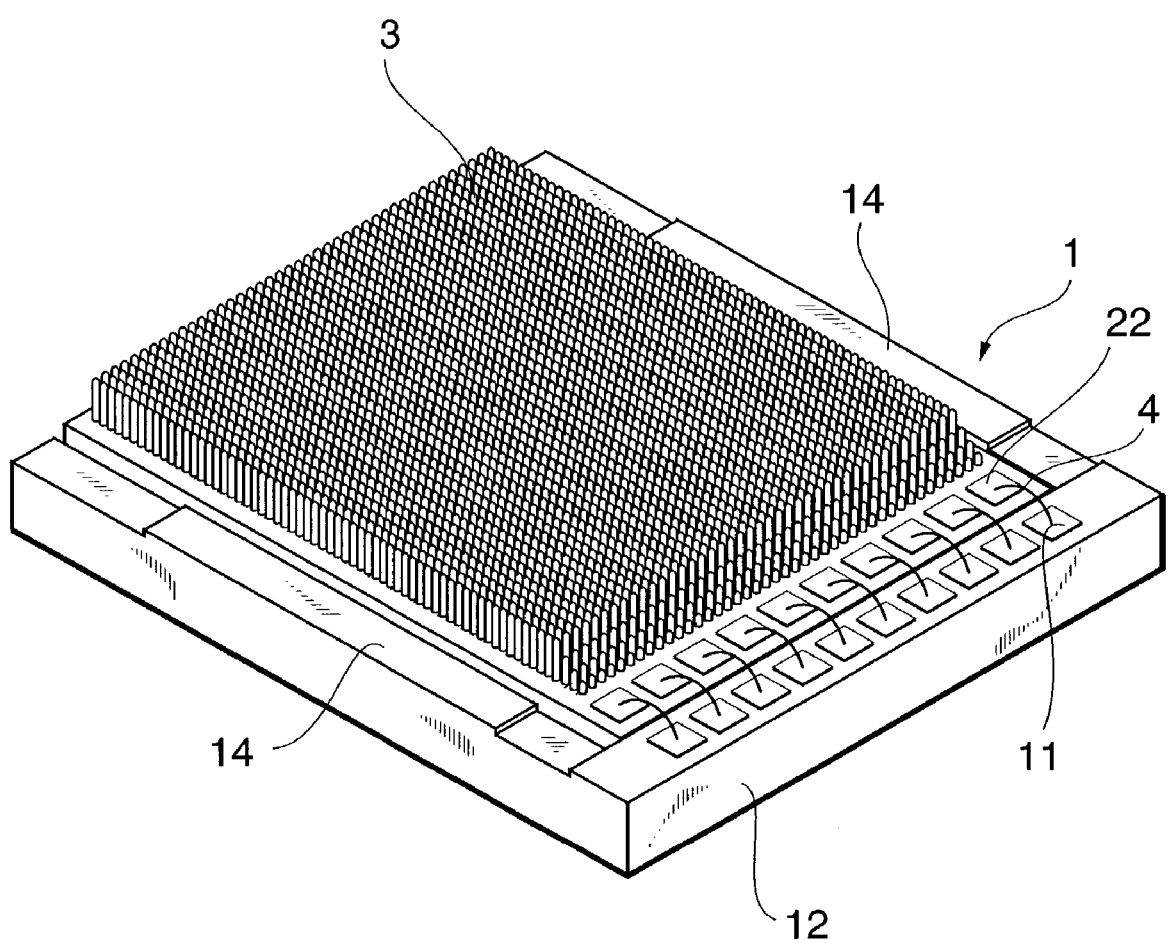
Figure 20:
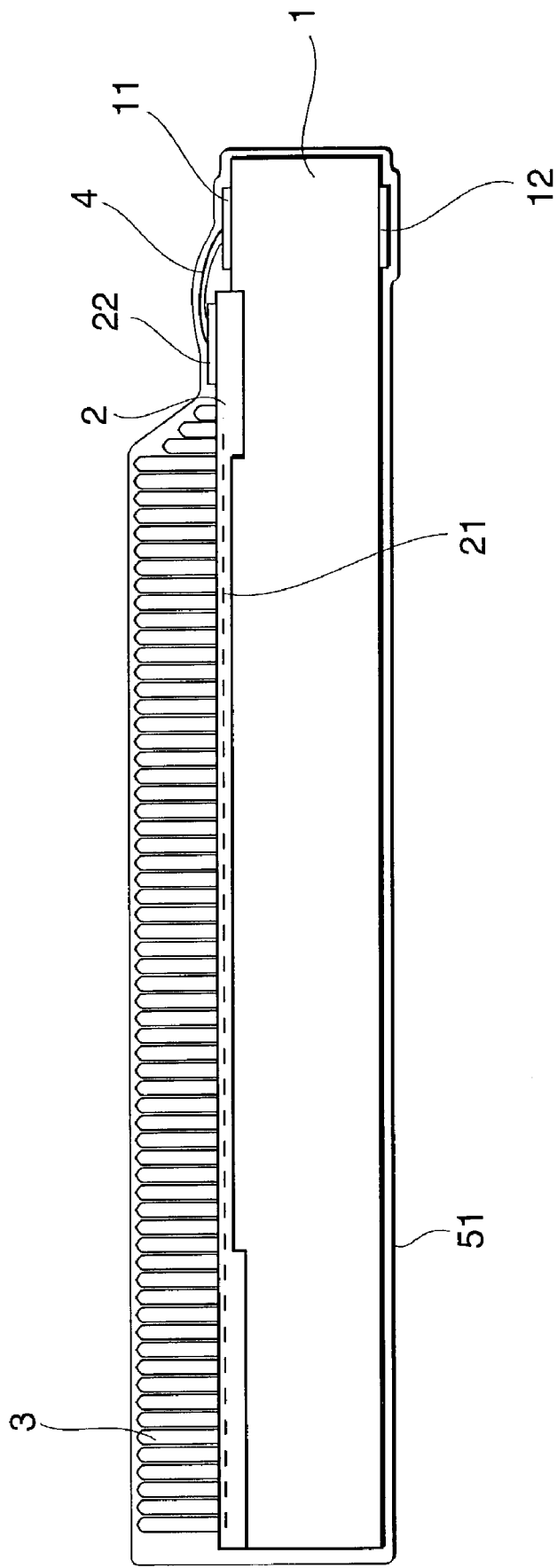

As shown in FIGS. 18 and 19, Tl-doped CsI is grown as columnar crystals to a thickness of about 200 μm by vacuum deposition on the light-receiving portion of the solid-state imaging element 2, thereby forming the layer of a scintillator 3. As described above, CsI is high deliquescent, and if CsI is kept exposed, it absorbs water vapor in air and dissolves. To protect the scintillator, the whole substrate 1 with the solid-state imaging element 2 bearing the scintillator 3 is covered with a 10-μm thick parylene film by CVD (Chemical Vapor Deposition), thus forming a first organic film 51.

Since parylene enters a narrow gap between CsI columnar crystals to a certain degree, the first organic film 51 tightly contacts the layer of the scintillator 3 and tightly seals the scintillator 3. The first organic film 51 is formed not only on the electrode pads 11 and 22 but also around the wiring lines 4 which connect them, and covers the wiring lines 4. This structure increases the adhesion and mechanical strengths of the wiring lines 4, and the wiring lines 4 can be easily handled in subsequent steps. By parylene coating, a uniform-thickness precise thin film coating can be formed on the corrugated layer surface of the scintillator 3. CVD formation of parylene can be achieved at room temperature with a lower degree of vacuum than in metal deposition, and parylene can be easily processed.

Figure 21:
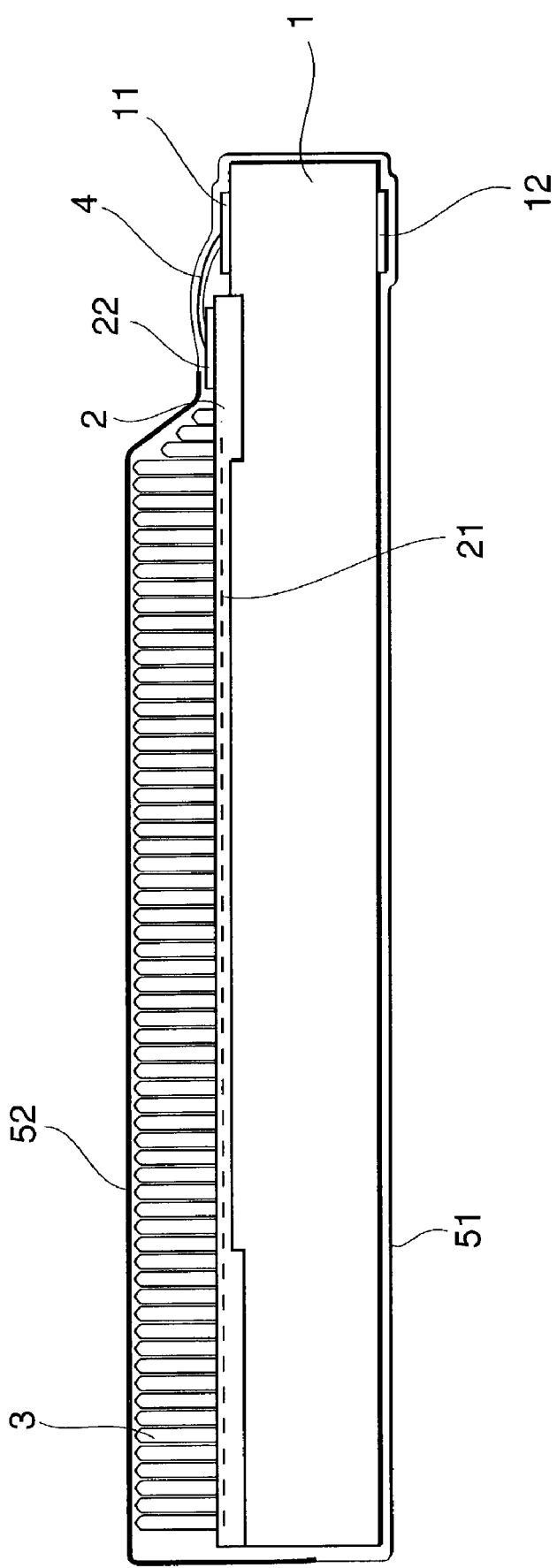

As shown in FIG. 21, a 0.15-μm thick Al film is stacked on the incident surface of the first organic film 51 by vapor deposition, thereby forming a metal thin film 52. In forming the metal thin film 52, a proper mask (not shown) is desirably arranged in front of the layer of the scintillator 3 so as to form the metal thin film 52 only immediately above the layer of the scintillator 3 on the first organic film 51. Even if the mask is arranged metal vapor may slightly flow outside the mask in vapor deposition. Especially at a small interval between the light-receiving portion and the electrode pad, it is difficult to form the metal thin film 52 only immediately above the layer of the scintillator 3. The metal may be deposited on the wiring lines 4 and the electrode pads 11 and 22. According to the present invention, the metal thin film 52 is not directly formed on the wiring lines 4 and the electrode pads 11 and 22 because the wiring lines 4 and the electrode pads 11 and 22 are covered with the first organic film 51. Short-circuiting of the wiring lines 4 and the electrode pads 11 and 22 by the metal thin film 52 can be effectively prevented.

Also when no mask is arranged in vapor deposition of the metal thin film 52, the metal thin film 52 is formed on the wiring lines 4 and the electrode pads 11 and 22. However, the wiring lines 4 and the electrode pads 11 and 22 are covered with the first organic film 51, and short-circuiting can be prevented. The humidity resistance can be further increased by widely forming the metal thin film 52 so as to cover the wiring lines 4 and the electrode pads 11 and 22 via the first organic film 51.

Figure 22:
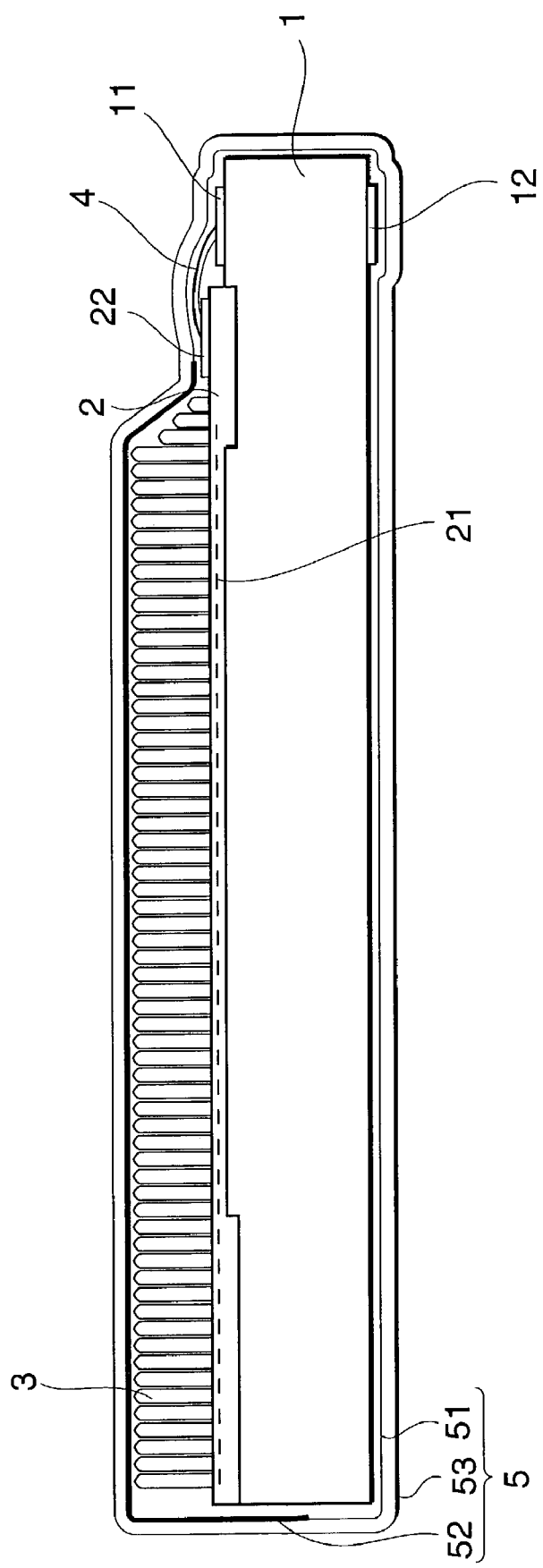

Then, parylene is applied to a thickness of 10 μm on the entire surface of the substrate by CVD again, thereby forming a second organic film 53 (see FIG. 22). The second organic film 53 prevents contamination, peeling, or oxidization of the metal thin film 52 by handling or the like. Consequently, a protective film 5 as a multilayered structure of the first organic film 51, metal thin film 52, and second organic film 53 is formed.

When the metal thin film 52 is formed on the wiring lines 4 and the electrode pads 11 and 22 via the first organic film 51, the metal thin film 52 and second organic film 53 are formed not only on the surfaces of the electrode pads 11 and 22 but also around the wiring lines 4 which connect them. The wiring lines 4 are triple-coated with the first organic film 51, metal thin film 52, and second organic film 53, which can further increase the mechanical and adhesion strengths of the wiring lines 4. When the metal thin film 52 is formed using a mask, as described above, a double coating of the first and second organic films 51 and 53 is formed around the wiring lines 4 and on the electrode pads 11 and 22.

Figure 23:
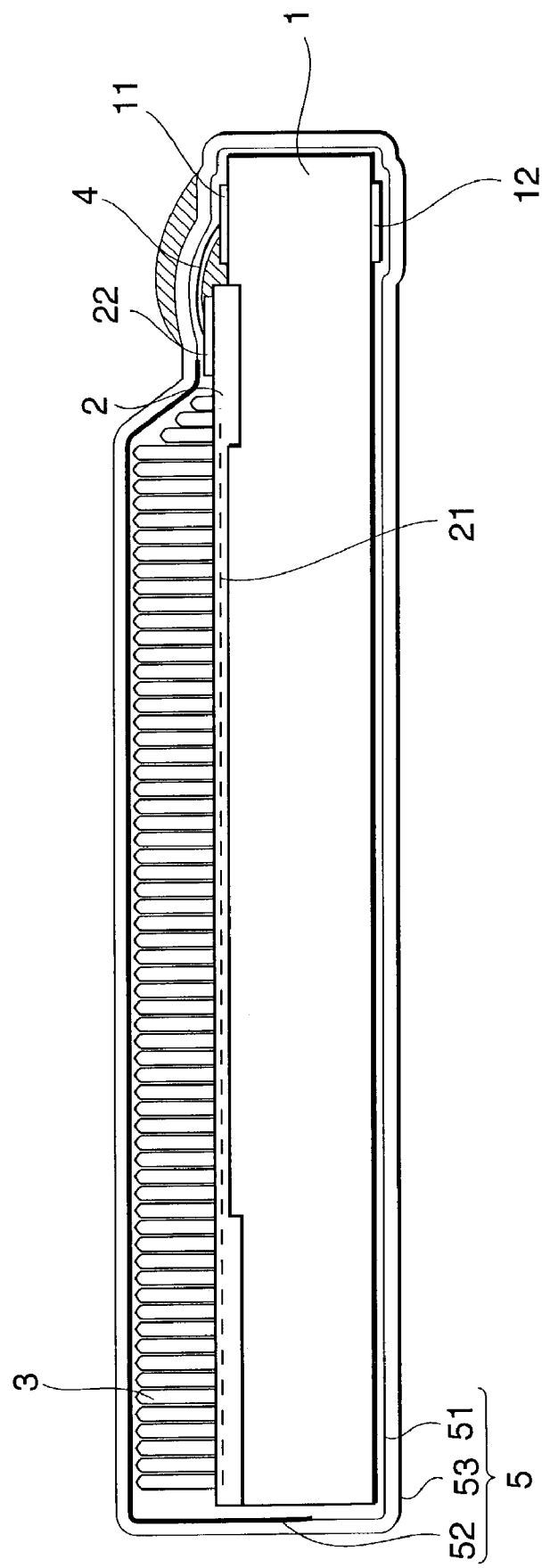
Figure 24:
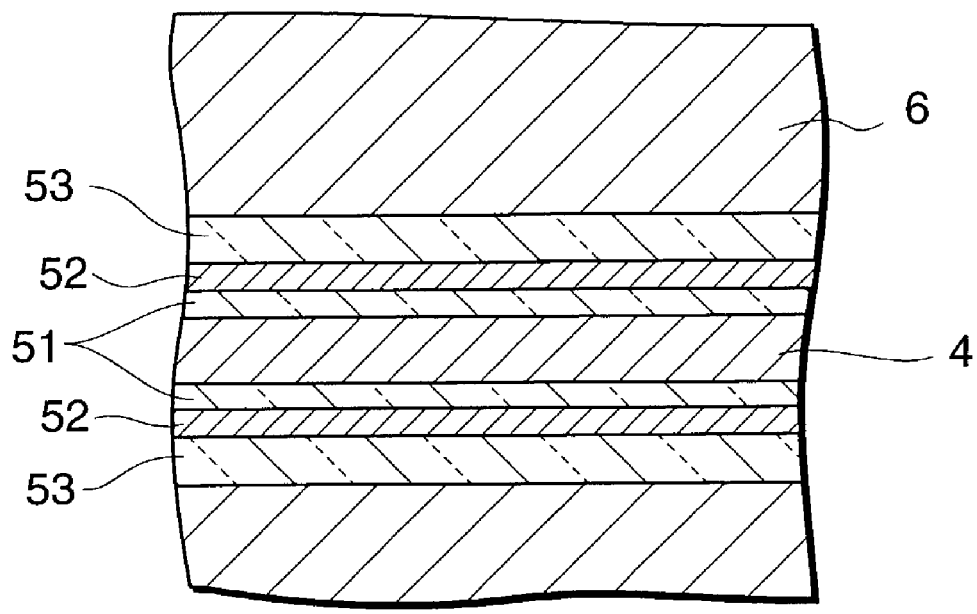
FIGS. 24 and 25 are an enlarged sectional view of a wiring portion in FIG. 23 and an enlarged sectional view of its modification.
Figure 25:
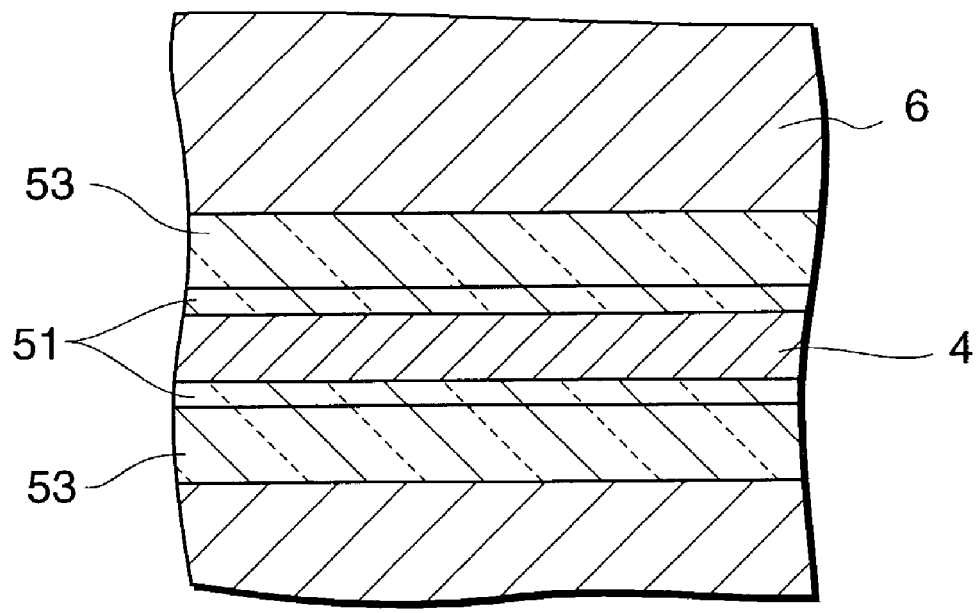

Subsequently, a resin is applied to the protective film 5 on the electrode pads 11 and 12 so as to surround the wiring lines 4 covered with the protective film 5. This resin is cured to form a protective resin layer 6 (see FIG. 23). The wiring lines 4 project on the protective film 5 covering the electrode pads 11 and 12, and when the metal thin film 52 is also formed on the wiring lines 4, the periphery of each wiring line 4 is triple-coated with the protective film 5 made up of the organic films 51 and 53 and the metal thin film 52 (see FIG. 24). If no metal thin film 52 is formed on the wiring lines 4, the wiring lines 4 are double-coated with the organic films 51 and 53 (see FIG. 25). In either case, the protective resin layer 6 surrounds the covered wiring lines 4 and pots them, as shown in FIGS. 23 to 25. The wiring lines 4 are further protected, and damage to the wiring lines 4 in use can be effectively prevented. The protective resin layer 6 need not always be arranged, but is preferably formed in terms of protection of the wiring lines 4.

Of the formed protective film 5, the protective film 5 on the lower surface of the substrate 1 is removed to expose external connection electrode terminals 12 on the lower surface of the substrate 1. As a result, the radiation detector shown in FIGS. 15 to 17 is obtained.

In the second embodiment, similar to the first embodiment, almost all light generated by the scintillator 3 can be guided to a photoelectric conversion element 2, and an image signal with a high S/N ratio corresponding to an X-ray image can be obtained.

In the above description, the metal thin film 52 is sandwiched between the parylene organic films 51 and 53 as the protective film 5. The first and second organic films 51 and 53 may be made of different materials. In the use of a corrosion-resistant material such as gold for the metal thin film 52, the second organic film 53 may be omitted.

In the above description, the first organic film 51 covers up to the side surface of the substrate 1. The first organic film 51 suffices to cover at least the entire scintillator 3, the electrode pads 11 and 22, and the wiring lines 4, and need not cover the remaining portion of the substrate 1. If the protective film 5 covers the surface of the substrate 1, the edge of the first organic film 51 is in tight contact with the substrate 1 to effectively prevent peeling of the first organic film 51 from the edge.

The solid-state imaging element 2 may be formed from an amorphous silicon photodiode (PD) array and thin-film transistor (TFT), or may be a MOS image sensor.

The use of this structure can decrease the thickness of the radiation detector to about 2.5 mm in both the first and second embodiments, which is almost half a 5-mm thickness of a radiation detector with a conventional FOP (Fiber Optical Plate). The total area can be decreased by decreasing the area around the light-receiving portion while ensuring almost the same area of the light-receiving portion as that of the prior art (Japanese Patent Laid-Open No. 10-282243) by narrowing the gap between the bonding pad and the light-receiving portion. Accordingly, a compact (about 90% the prior art) radiation detector can be implemented. This is greatly advantageous to a dental radiation detector used upon insertion into an oral cavity.

INDUSTRIAL APPLICABILITY

The present invention can be preferably used as a relatively compact radiation detector, e.g., a dental radiation detector used upon insertion into an oral cavity.

The invention claimed is:

1. A radiation detector manufacturing method comprising the steps of:
fixing a solid state imaging element having a light receiving portion where a plurality of photoelectric conversion elements are arranged and having a first set of electrode pads electrically connected to the photoelectric conversion elements to a support surface of a substrate having external connection electrodes and a second set of electrode pads electrically connected to the external connection electrodes so as to make electrode pads of the first set of electrode pads face corresponding electrode pads of the second set of electrode pads;

electrically connecting the corresponding electrode pads in the first and second sets of electrode pads by wiring lines;

covering at least the wiring lines and the electrode pads with an electrical insulating covering member;

forming a scintillator on the light-receiving portion of the solid state imaging element;

tightly sealing the covering member and the scintillator with an electrical insulating organic film;

forming a metal thin film which covers a portion of the organic film on the scintillator; and exposing the external connection electrodes.

2. A radiation detector manufacturing method comprising the steps of:

fixing a solid-state imaging element having a light receiving portion where a plurality of photoelectric conversion elements are arranged and having a first set of electrode pads electrically connected to the photoelectric conversion elements to a support surface of a substrate having external connection electrodes and a second set of electrode pads electrically connected to the external connection electrodes so as to make electrode pads of the first set of electrode pads face correspond electrode pads of the second set of electrode pads;

electrically connecting the corresponding electrode pads in the first and second sets of electrode pads by wiring lines;

forming a scintillator on the light-receiving portion of the solid state imaging element;

forming an electrical insulating organic film which covers the electrode pads, the wiring lines, and the scintillator, thereby tightly sealing the scintillator;

forming a metal thin film which covers a portion of the organic film on the scintillator; and exposing the external connection electrodes.

3. A radiation detector manufacturing method according to claim 2, further comprising the step of covering the wiring lines with a protective resin after the step of forming the organic film.

4. A radiation detector manufacturing method according to any one of claims 1 to 3, further comprising the step of forming a second organic film which covers the metal thin film.

5. A radiation detector comprising:

a solid-state imaging element having a light-receiving portion where a plurality of photoelectric conversion elements are arranged, and a first set of electrode pads electrically connected to the photoelectric conversion elements;

a substrate which has external connection electrodes and a second set of electrode pads electrically connected to the external connection electrodes and on which said solid-state imaging element is fixed;

a scintillator formed on a surface of the light receiving portion of said solid-state imaging element;

wiring lines which electrically connect respective corresponding electrode pads of said first and second sets of electrode pads;

a protective resin covering said wiring lines;

an electrical insulating organic film formed to cover at least said scintillator and said protective resin; and a metal thin film formed on said organic film.

6. A radiation detector according to claim 5, further comprising a second organic film formed on said metal thin film.

7. A radiation detector according to claim 5, wherein said organic film covers up an exposed surface of said substrate.

8. A radiation detector comprising:

a solid-state imaging element having a light-receiving portion where a plurality of photoelectric conversion elements are arranged, and a first set of electrode pads electrically connected to the photoelectric conversion elements;

a substrate which has external connection electrodes and a second set of electrode pads electrically connected to the external connection electrodes and on which said solid-state imaging element is fixed;

a scintillator formed on a surface of the light receiving portion of said solid-state imaging element;

wiring lines which electrically connect respective corresponding electrode pads of said first and second sets of electrode pads;

an electrical insulating organic film formed to encapsulate said scintillator and cover said wiring lines and both of said corresponding electrode pads; and a metal thin film formed on said organic film.

9. A radiation detector according to claim 8, further comprising a second organic film formed on said metal thin film.

10. A radiation detector according to claim 8, further comprising a protective resin which covers said wiring lines from above said organic film.

11. A radiation detector according to claim 8, wherein said organic film covers up an exposed surface of said substrate.

* * * * *